US010509220B2

(12) United States Patent
Phipps et al.

(10) Patent No.: US 10,509,220 B2
(45) Date of Patent: Dec. 17, 2019

(54) ELECTROWETTING CELL CONSTRUCTS

(71) Applicant: ABL IP HOLDING LLC, Conyers, GA (US)

(72) Inventors: James Michael Phipps, Fairfax, VA (US); Alexander Jacob Schultz, Sterling, VA (US); John M. Reilly, Leesburg, VA (US); An Mao, Jersey City, NJ (US)

(73) Assignee: ABL IP HOLDING LLC, Conyers, GA (US)

(*) Notice: Subject to any disclaimer, the term of this patent is extended or adjusted under 35 U.S.C. 154(b) by 120 days.

(21) Appl. No.: 15/674,040

(22) Filed: Aug. 10, 2017

(65) Prior Publication Data

US 2019/0049715 A1    Feb. 14, 2019

(51) Int. Cl.
*G02B 26/00* (2006.01)
*G02B 3/14* (2006.01)

(52) U.S. Cl.
CPC ............ *G02B 26/005* (2013.01); *G02B 3/14* (2013.01)

(58) Field of Classification Search
CPC ........ G02F 1/134309; G02F 2201/123; G02F 1/133707; G02F 1/13624; G02F 1/1334; G02F 1/134327; G02F 1/1345; G02F 1/13476; G02F 2001/13345; G02F 2001/136236; G02F 2001/13629; G02F 2201/122; G02F 2203/30; G02F 2203/60; G02F 1/0105; G02F 1/0316; G02F 1/05; G02F 1/055; H01L 2924/00; H01L 2924/0002; H01L 27/11; H01L 27/1104;
(Continued)

(56) References Cited

U.S. PATENT DOCUMENTS 7,688,518 B2    3/2010  Sutherland
8,408,765 B2    4/2013  Kuhlman et al.
(Continued)

FOREIGN PATENT DOCUMENTS

WO      2007/058451      5/2007

OTHER PUBLICATIONS

U.S. Appl. No. 15/479,857, filed Apr. 5, 2017, entitled "Electrowetting Assembly Technique and Cell Structure" (72 pages).
(Continued)

*Primary Examiner* — Brandi N Thomas
(74) *Attorney, Agent, or Firm* — RatnerPrestia

(57) ABSTRACT

An electrowetting cell includes a substrate that includes a well filled with at least one fluid an external contact surface. The substrate is formed of ceramic or fiberglass mesh infused with resin. A control channel electrode connection pad and a common electrode connection pad are on the external contact surface. A first plate is coupled to the substrate to seal a first end of the well. A second plate is coupled to the substrate to seal a second end of the well. The electrowetting cell further includes a control channel electrode on the substrate configured to control a shape of the at least one fluid via an electric field, a common electrode, a control channel electrode interconnect connected to the control channel electrode and the control channel electrode connection pad, and a common electrode interconnect connected to the common electrode and the common electrode connection pad.

18 Claims, 16 Drawing Sheets

(58) Field of Classification Search
CPC . H01L 23/528; H01L 27/0207; H01L 27/092;
H01L 27/088; H01L 2924/13091; H01L
2924/14; H01L 2027/11853; H01L
2027/11875
USPC ........ 359/237, 242, 265–267, 315, 321–322,
359/298
See application file for complete search history.

(56) References Cited

U.S. PATENT DOCUMENTS

| | | | |
|---|---|---|---|
| 2005/0210983 A1* | 9/2005 | Klein .................... | G01N 29/07 73/627 |
| 2009/0262536 A1* | 10/2009 | Hoelen .................... | F21V 5/04 362/257 |
| 2012/0105955 A1* | 5/2012 | Takai .................... | G02B 3/0075 359/463 |
| 2012/0206540 A1* | 8/2012 | Kato ........................ | B41J 2/161 347/50 |
| 2016/0225745 A1* | 8/2016 | Beer .................... | H01L 25/0657 |

OTHER PUBLICATIONS

U.S. Appl. No. 15/661,742, filed Jul. 27, 2017, entitled "Sealing and Lateral Pressure Compensation Structures Usable With Fluidic or Gaseous Material Containers" (72 pages).
U.S. Appl. No. 15/228,414, filed Aug. 4, 2016, entitled "Configurable Optical Transducers Using an Optical Modulator and One or More Lenses" (49 pages).
U.S. Appl. No. 15/389,823, filed Dec. 23, 2016, entitled "Electrowetting Cellular Array And Luminaire Incorporating The Array" (47 pages).

* cited by examiner

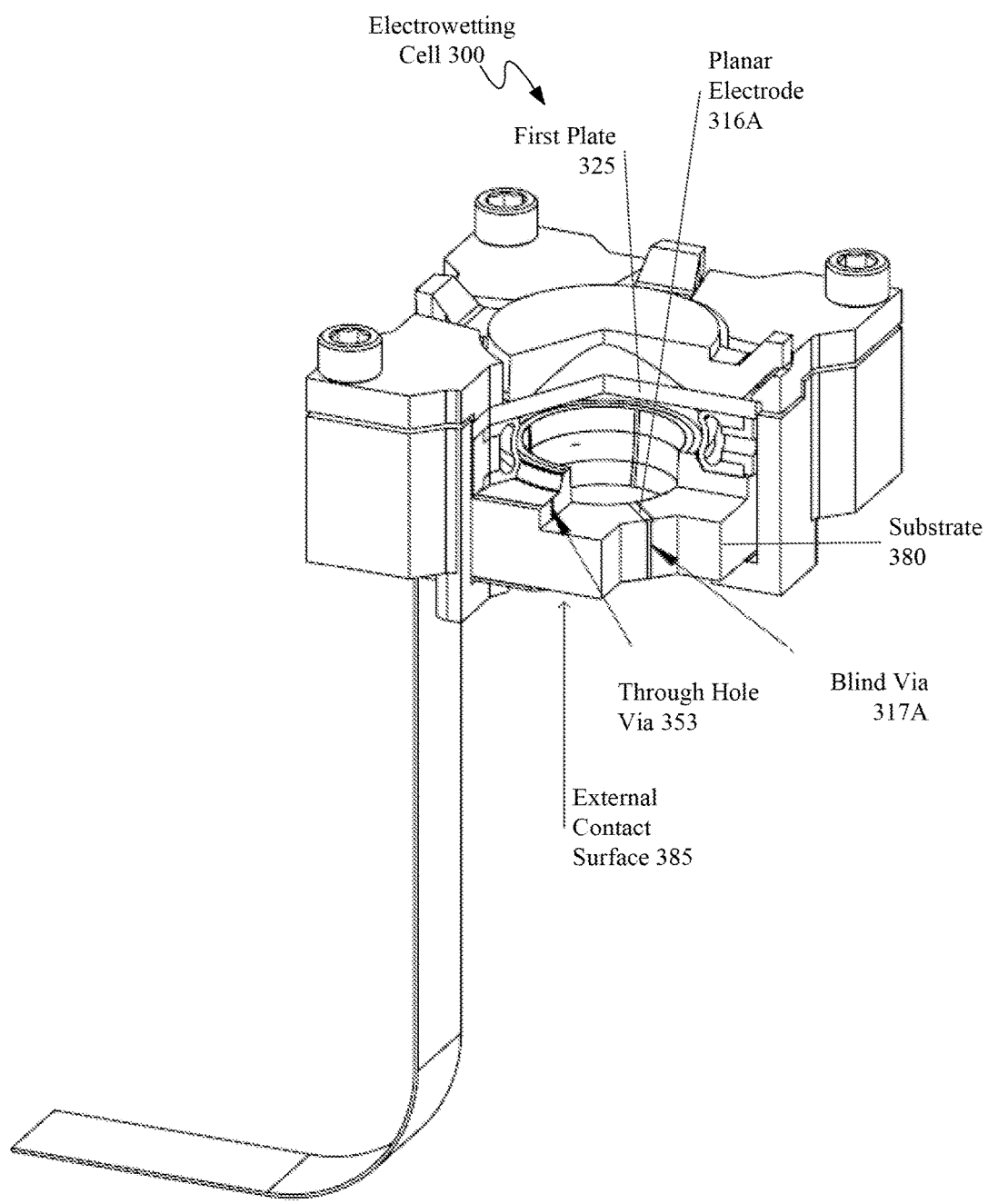

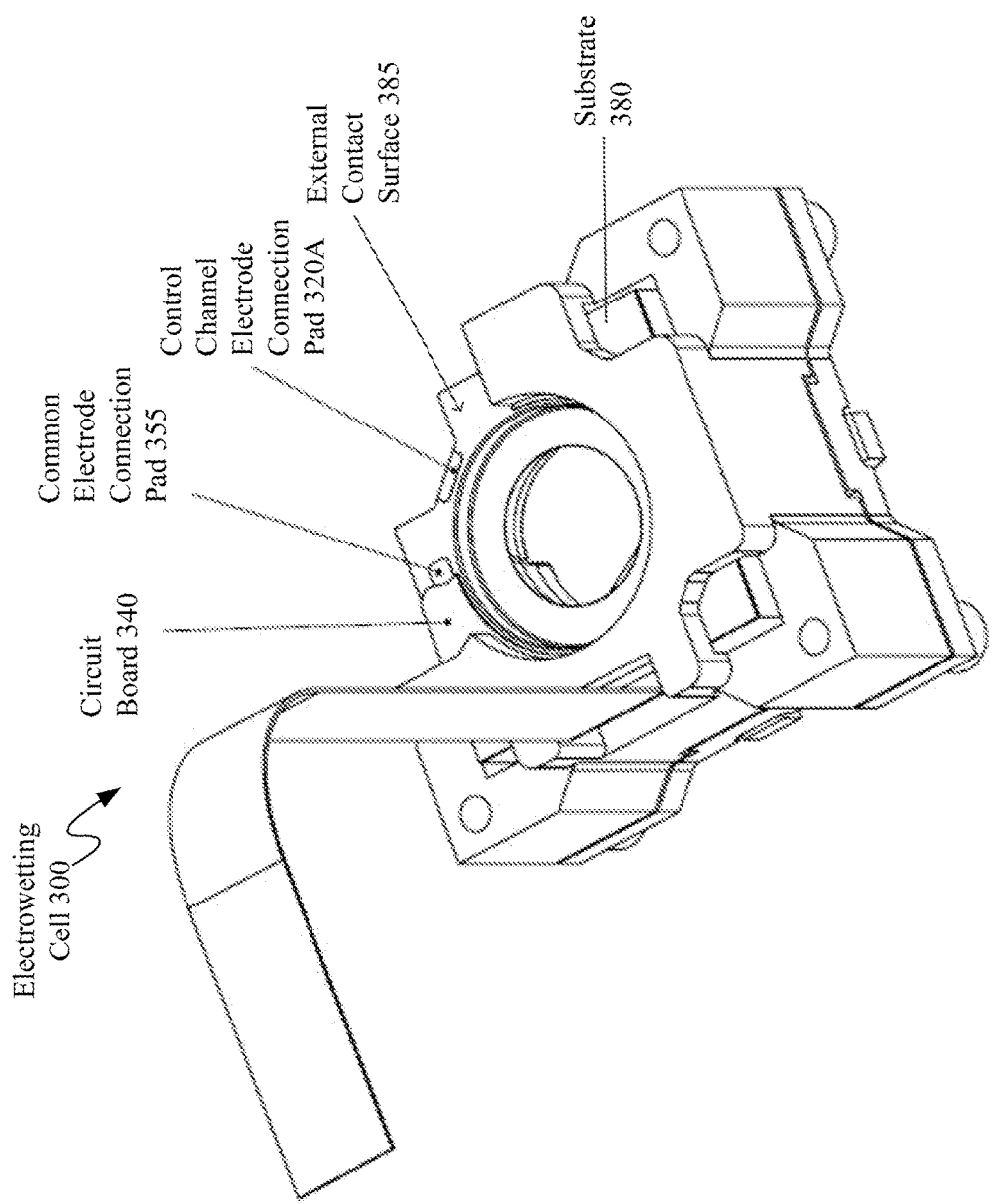

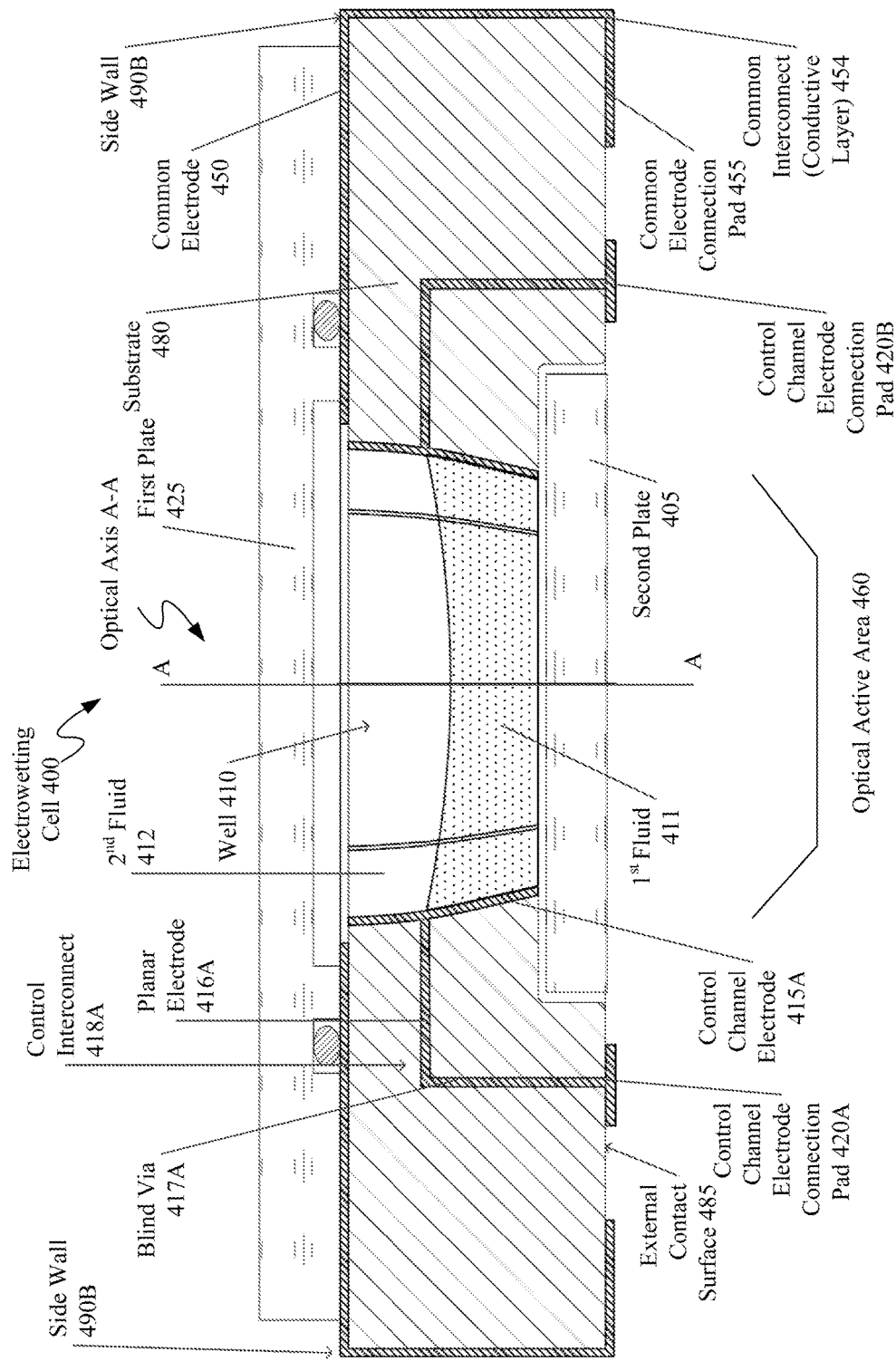

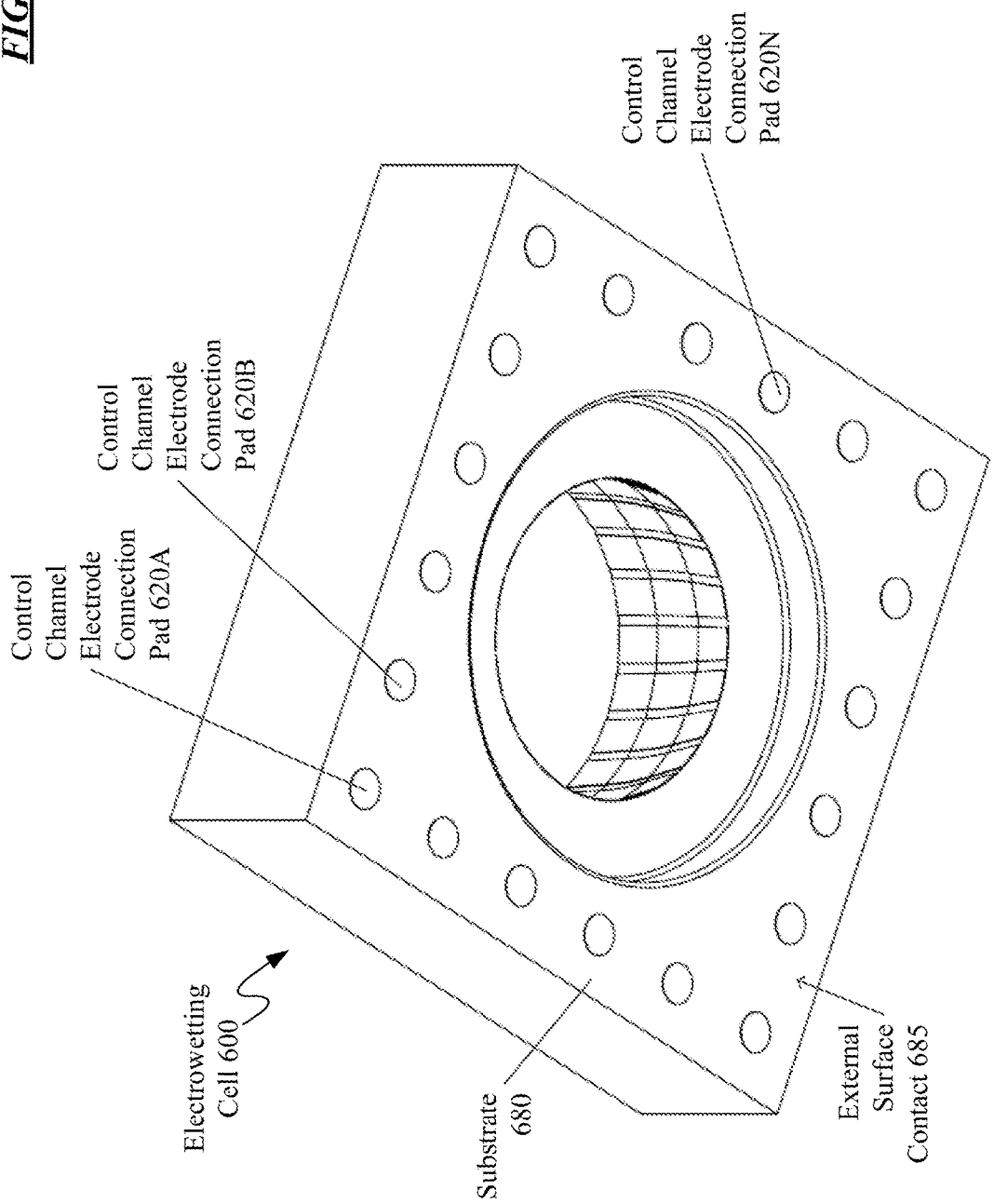

ELECTROWETTING CELL CONSTRUCTS

TECHNICAL FIELD

The present subject matter relates to constructs for an electrowetting cell, e.g., fluid lens or prism, for beam shaping or steering applications.

BACKGROUND

Electrowetting is a microfluidic phenomenon that modifies the shape of a liquid in relation to a surface by applying an electrical field, e.g. by applying a voltage across two electrodes. For example, if the surface is hydrophobic, the electrical field causes a change in the shape of the liquid that appears to change the wetting properties of the hydrophobic surface. If the fluid(s) in an electrowetting cell and some of the wall(s) around the fluid(s) are sufficiently transparent, the electrowetting cell may be used as an electrically controllable optic. Such optics have recently been the subject of a widening scope of light processing applications, such as variable lenses, variable prisms, optical switches, displays, etc.

Electrowetting lenses provide controllable beam shaping. There have been proposals to develop variable optical prisms using electrowetting cell arrangements. An electrowetting optic may have various different shaped structures, e.g., round, square or rectangular. The overall working principle for either beam shaping or steering is the same—the voltage applied across the dielectric layer attracts or repels the conducting liquid so as to change the wetting area of the cell and thus the shape of the liquid(s) in the cell.

Constructs for electrowetting optics have typically used glass substrates.

SUMMARY

In an example, an electrowetting cell includes a substrate that includes a well filled with at least one fluid and an external contact surface that is outside of the electrowetting cell. The substrate is formed of ceramic or fiberglass mesh infused with resin. The electrowetting cell further includes a control channel electrode connection pad on the external contact surface and a common electrode connection pad on the external contact surface. The electrowetting cell also includes a first plate coupled to the substrate to seal a first end of the well and a second plate coupled to the substrate to seal a second end of the well. One of the plates is transparent. The electrowetting cell also includes a control channel electrode on the substrate configured to control a shape of the at least one fluid via an electric field and a common electrode. The electrowetting cell further includes a control channel electrode interconnect connected to the control channel electrode and the control channel electrode connection pad. The electrowetting cell also includes a common electrode interconnect connected to the common electrode and the common electrode connection pad.

In another example, an electrowetting cell optic includes a substrate that includes a well filled two fluids and an external contact surface outside the well and around at least a portion of one end of the well. The substrate is formed of ceramic or fiberglass mesh infused with resin. The electrowetting cell optic further includes a plurality of control channel electrode connection pads on the external contact surface and a common electrode connection pad on the external contact surface. The electrowetting cell optic also includes a first plate coupled to the substrate to seal a first end of the well and form a transparent window at one axial end of the well and a second plate coupled to the substrate to seal a second end of the well and form a transparent cover window at an opposite axial end of the well. The electrowetting cell optic further includes a plurality of control channel electrodes to control shape of a meniscus formed between the two fluids via separately controllable electric fields. Each of the control channel electrodes is mounted to the substrate on a wall of the well. The electrowetting cell optic also includes a common electrode located on the substrate to contact a conductive one of the fluids and a respective control channel electrode interconnect connected to each respective control channel electrode and a respective control channel electrode connection pad. The electrowetting cell optic further includes a common electrode interconnect connected to the common electrode and the common electrode connection pad.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 3B is a cutaway view of the third electrowetting construct illustrating the substrate, the first plate, a through hole via interconnect to the common electrode, and blind via interconnects to the control channel electrodes.

FIG. 3C is a cutaway view of the third electrowetting cell construct which is upside down relative to FIG. 3B and shows the via interconnects reaching the control channel electrode and common electrode connection pads.

FIG. 4 is an assembled fourth electrowetting cell construct with two fluids, including a substrate formed of ceramic or fiberglass mesh infused with resin, first and second plates, a conductive layer interconnect for a common electrode, and via interconnects for control channel electrodes.

FIGS. 6A-B depict more complex control channel electrode layouts achievable through the use of a substrate formed of ceramic or fiberglass mesh infused with resin and compatible electronics manufacturing processes.

DETAILED DESCRIPTION

Figure 1A:
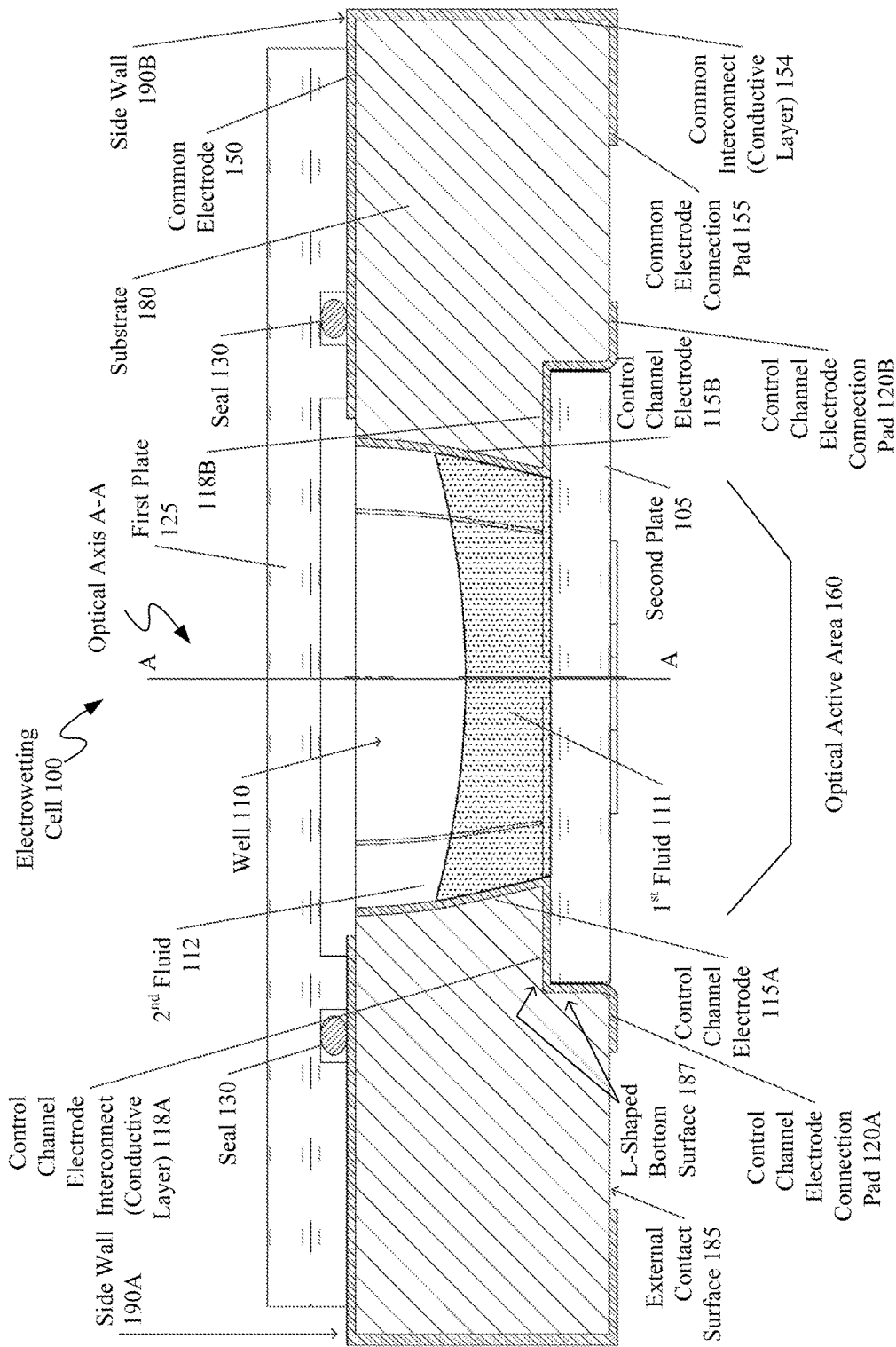
FIG. 1A is a cross-sectional view of parts of an assembled first electrowetting cell construct, including a substrate formed of ceramic or fiberglass mesh infused with resin, first and second plates, and conductive layer interconnects for control channel and common electrodes.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

More complex electrode patterns are needed for applications for electrowetting cells including beam steering, dual lens designs, or in cases where meniscus shape compensation methods may be required. Routing the electrodes that accomplish this level of control becomes increasingly difficult. The techniques described herein provide an integrated approach that can make more complex electrode patterns easier, have a higher part yield, as well as simplify the assembly process for electrowetting cells, for example, making it more feasible for cost sensitive markets like general lighting.

More specifically, the techniques described herein are for electrical connections for an electrowetting cell and can be integrated into a substrate formed of ceramic or fiberglass mesh infused with resin and routed for convenient placement through the use of vias, conductive layers (e.g., metals, indium tin oxide, etc.) formed on surface layers of the substrate, and the inclusion of planar conductors in the case of a layered design. In the case of a solid substrate, such as ceramic or fiberglass mesh infused with resin, conductive layers (e.g., metals) can be formed on the surface of the substrate to route conductors around the perimeter of the substrate and vias could be added as well for through substrate connections.

It should be understood that the "ceramic" material that may form the substrate can be alumina (or aluminum oxide $Al_2O_3$), aluminum nitride (AlN), zirconia toughened alumina, beryllium oxide (BeO), and other suitable ceramic material compositions. Ceramics are inorganic, non-metallic materials that have been processed at high temperatures to attain desirable engineered properties. Advanced ceramics such as those just listed are often used in electronic packages and applications requiring high strength, high thermal conductivity, and excellent electrical properties. A ceramic material may be a solid material, such as crystalline oxide, nitride or carbide material that can comprise metal, non-metal or metalloid atoms primarily held in ionic and covalent bonds. Some elements, such as carbon or silicon, may be used to form ceramic materials. Glass is typically not considered a ceramic material because of its amorphous (non-crystalline) character and transparency.

It should be understood that the "fiberglass mesh infused with resin" material that can form the substrate refers to fiberglass-reinforced epoxy laminate or sheets that include woven fiberglass cloth with an epoxy resin binder. Depending on the design of the fiberglass mesh infused with resin, the substrate can have various glass transition temperatures (Tg) or higher glass content. For example, the fiberglass mesh infused with resin can be CEM, G10, G11, FR4, FR5, FR6, and other known suitable materials. Fiberglass mesh infused with resin can be manufactured in varying layer thicknesses to achieve varying total thicknesses. Vias used in fiberglass mesh infused with resin can come in many forms and cross sectional shapes with solder filled vias (flooded), hollow plated vias, blind vias (which cross the partial thickness of the fiberglass mesh infused with resin), through vias (which cross the total thickness of the fiberglass mesh infused with resin), as well as other known via technologies and techniques utilized in industry.

Electrowetting is a fluidic phenomenon that enables changing of the configuration of a contained fluid system in response to an applied voltage. In general, application of an electric field seemingly modifies the wetting properties of a surface (e.g. the ability of fluid to maintain physical contact with a hydrophobic surface) in the fluid system. Assuming a two fluid system, where one fluid is relatively conductive, and the other is relatively non-conductive; when a fluid is in contact with a surface and that surface becomes charged, the electric field tends to pull the mass of the electrically conductive fluid towards the surface. As the conductive fluid changes shape due to this force, the non-conductive fluid also changes shape. On a micro scale, the contact angle is unaffected. On a macro scale it seems that the wetting properties have changed. This phenomenon enables controlled changes to the overall distribution and shape of the fluids with respect to the surface, in response to changes of the voltage(s) applied to change the electric field.

Examples of electrowetting optics described in detail herein and shown in several of the drawings use two immiscible fluids having different electrical properties. In at least some examples, the two fluids have different indices of refraction. One fluid may be conductive. The other fluid, typically the fluid adjacent to a hydrophobic surface, may be non-conductive. The conductive fluid may be a transparent fluid, but the other fluid may be substantially transparent or transmissive. Where both fluids are transparent or transmissive, the non-conductive fluid may exhibit a higher index of refraction than the conductive fluid. However, this is not necessary. In some examples, the non-conductive fluid may exhibit a lower index of refraction than the conductive fluid.

Examples of electrowetting cells are disclosed in U.S. patent application Ser. No. 15/479,857, filed Apr. 5, 2017, entitled "Electrowetting Assembly Technique and Cell Structure"; and U.S. patent application Ser. No. 15/661,742, filed Jul. 27, 2017, entitled "Sealing and Lateral Pressure Compensation Structures Usable With Fluidic or Gaseous Material Containers," the entire contents of which are incorporated by reference herein.

In a transmissive electrowetting optic example using two fluids, changing the applied electric field changes the shape of the fluid interface surface between the two fluids and thus the refraction of the light passing through the interface surface, for example, so that the electrowetting optic operates as a variable shape lens and/or a variable shape prism. Depending on the application for the electrowetting optic, the light may enter the fluid system to pass first through either one or the other of the two fluids.

As commercial applications for electrowetting cells expand, such cells are used in increasing numbers. Production and varied applications of large numbers of electrowetting cells call for improved assembly techniques, e.g. more efficient and/or providing a more effective yield rate. An effective cell structure should include a suitable electrode layout, fluid sealing and mechanical structure, yet enable an efficient assembly methodology.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate or carry the light or signals.

Reference now is made in detail to the examples illustrated in the accompanying drawings and discussed below.

The orientations of the electrowetting cells, associated components and/or any complete devices incorporating a cell such as shown in any of the drawings, are given by way of example only, for illustration and discussion purposes. In operation for a particular variable optical processing application, an electrowetting cell may be oriented in any other direction suitable to the particular application of the cell, for example up light or side light or any other orientation. Also, to the extent used herein, any directional term, such as lateral, longitudinal, up, down, upper, lower, top, bottom and side, are used by way of example only, and are not limiting as to direction or orientation of any optic or component of an optic constructed as otherwise described herein.

FIG. 1A is a cross-sectional view of an assembled first electrowetting cell construct 100. As shown, the electrowetting cell 100 includes a first plate 125, a second plate 105, a substrate 180 formed of ceramic or fiberglass mesh infused with resin, a well 110 in the middle of the substrate 180, control channel electrodes 115A-B, a common electrode 150, and various interconnects that lead to external contact surface 185, for example, that is located outside the well 110 and around at least a portion of one end of the well 110 to provide electrical connection to the electrodes as depicted. In an example, the external contact surface 185 can be located outside of the electrowetting cell 100. In the visible cross-section illustrated in the example, electrowetting cell 100 includes two control channel electrode interconnects 118A-B and a common electrode interconnect 154. Although not completely visible, it should be understood that, in total, there are four control channel electrodes and four respective control channel electrode interconnects, two of which the cross-section intersects. An additional control channel electrode is visible on the back wall of the well 110, and one of the four control channel electrodes is not visible in the depicted cross-section.

Each control channel electrode interconnect 118A-B is connected to a respective control channel electrode 115A-B and a respective control channel electrode connection pad 120A-B. The common electrode interconnect 154 is connected to the common electrode 150 and the common electrode connection pad 155. In the example of FIG. 1A, each of the control channel electrode interconnects 118A-B is a conductive layer deposited on at least one surface of the substrate 180 that leads to a respective control channel electrode connection pad 120A-B to provide electrical connectivity between the respective control channel electrode 115A-B and the respective control channel electrode connection pad 120A-B. The control channel electrodes 115A-B are formed on the side walls of the well 110 to control a shape of different portions of the second fluid 112 in the well 110 in response to applied control voltage. Each of the control channel electrodes 115A-B can be formed of aluminum or other suitable material.

The various electrowetting cell constructs disclosed herein can be manufactured using a variety of techniques, including layering, injection molding, machining, or a combination thereof. Secondary machining operations can be used in combination with all three techniques. In one example, layered manufacturing builds various vias and embedded metallization of an electrowetting cell in discrete layers. As layers of the substrate are deposited, various internal conductive traces, such as planar electrodes; and vias, such as blind and through vias, are formed. Secondary machining operations may be used to form non-constant planar conductive traces, for example.

In the example of FIG. 1A, an L-shaped bottom surface 187 of the substrate 180 that is adjacent the second plate 105 may be shaped via layering, injection molding, or machining and then may be plated, where appropriate. For example, surface metallization layers can be deposited as the conductive layers that form the control channel electrode interconnects 118A-B.

As will be described with respect to FIGS. 2-5 below, control channel electrode vias can be formed to allow the control channel electrode interconnects 118A-B to connect through the ceramic or fiberglass mesh infused with resin substrate 180 instead of through the surface traces on the substrate 180. In one example, such constructs may be formed using a layered manufacturing approach.

Returning to the example of FIG. 1A, the common electrode interconnect 154 is a conductive layer deposited on at least one surface of the substrate 180 that leads to the common electrode connection pad 155 to provide electrical connectivity between the common electrode 150 and the common electrode connection pad 155. As shown, both side walls 190A-B and the external contact surface 185 of the substrate 180 are plated with conductive layers, such as surface metallization layers.

It should be understood that each of control channel electrodes 115A-B includes a separate control channel electrode interconnect 118A-B as shown in FIG. 1A. Moreover, only one side of the electrowetting cell 110 is shown in the cross-section of FIG. 1A, which intersects control channel electrodes 115A-B and control channel electrode interconnects 118A-B. Although not visible, one additional control channel electrode, two control channel electrode interconnects, and two control channel electrode pads are formed in the example electrowetting cell 100.

Although only the common electrode interconnect 154 to the right side of the well 110 is labeled in FIG. 1A, multiple common electrode interconnects 154 can be formed that lead to the common electrode connection pad 155. Typically, the common electrode connection pad 155 is formed as a single continuous ring around the external contact surface 185. However, the common electrode connection pad 155 can be broken up into several pads depending on the design of the electrowetting cell 100.

In one example, an optical active area 160 may be formed through which light is transmitted or reflected through is formed and includes an optical axis A-A which corresponds to where light passes through the optical active area 160 of the cell 100. The second plate 105 shown on the bottom of the electrowetting cell 100 resides in the optical active area 160 and is a transparent window that can be formed of clear or transparent (e.g., highly light transmissive) glass, plastic (e.g., acrylic), etc. The first plate 125 shown on the top of the electrowetting cell 100 covering the well 110 can be formed of a variety of suitable materials, but the portion of the first plate 125 in the optical active area is also typically formed of clear or transparent glass, plastic, etc.

The well 110 is located inside the substrate 180 and is enclosed by the substrate 180 on the sides, the first plate 125 on the top, and the second plate 105 on the bottom. The well 110 is a hollow chamber filled with at least one fluid and the bottom, top, and sides of the well are enclosed. Generally described, the well 110 is a chamber or vessel that contains fluid(s), gas(es), or both. In an example, the well 110 is formed of the material of the first plate 125 and the second plate 105 on the top and bottom, respectively, and the material of the substrate 180 on side walls of the well 110. The well 110 may be filled with a first non-conductive fluid 111 which may be oil and a second conductive fluid 112 which may be water, and the fluids 111 and 112 are immiscible. The water and oil are controlled by an electric field that is imparted between the common electrode 150 and the control channel electrodes 115A-B that is based on an applied voltage. The water (conductive fluid) is driven while the shape of the oil is passively modified based on how the water displaces it. However, other fluids or gases can be used to fill the well 110 and various materials can be used to form the well 110, particularly in areas besides the top (e.g., first plate 125) and bottom (e.g., second plate 105) which are typically formed of transparent materials to allow for light transparency.

The two fluids 111 and 112 typically exhibit a difference in an optical characteristic, e.g. refractive index and/or reflectivity versus transmissivity. The first (non-conductive, e.g. insulating) fluid 111 may be a suitable oil. Suitable fluids for use as the second (conductive) fluid 112 include alcohols, glycols, ionic liquids, or other suitable liquid materials that can conduct electrical or ionic charges adequately to enable the electrowetting operations described herein. Conducting fluids may contain salts or other additives to alter their electrical conductivities. Specific examples of relatively insulating fluids that may be used include relatively non-conductive 'oil,' liquids such as Dow Corning OS-20, dodecane, and silicone oil. Specific examples of relatively conductive fluids that may be used include aqueous solutions for the more conductive liquid, such as: aqueous mixtures of sodium dodecyl sulfate (SDS), aqueous mixtures of potassium chloride (KCl), and propylene glycol (PG).

In the example, the first non-conductive fluid 111 is at the sealed distal end of the well 110 in the volume of the well 110 that is enclosed by the second plate 105 on the bottom and the substrate 180 on the sides. The second conductive fluid 112, fills a remainder of the well 110 at the proximal end of the well 110 in the volume of the well 110 that is enclosed by the first plate 125 on the top and by a seal 130 (e.g., O-ring) on the sides. The fluids 111 and 112 can be installed in the well 110 before installation of the seal 130 or after. Forming the control channel electrode interconnects 118A-B and common electrode interconnect 154 to lead to the external contact surface 185 of the electrowetting cell 100 where the fluids 111 and 112 are not contained allows for robust electrical connections to the control channel electrodes 115A-B and common electrode 150 after the filling process.

But in the electrowetting cell constructs disclosed herein (FIGS. 1-5), such as that shown in FIG. 1A, forming the interconnects 118A-B and 154 to lead to an external contact surface 185 away from sealing surface, such as on the bottom surface or side walls 190A-B of the cell 100 instead of the top where the cell 100 is being sealed allows for reliable electrical connections to be formed and protects the circuit board from the fluids during assembly. The electrowetting cell constructs may avoid having an undesired micro layer of fluid on the electrical contacts.

In the electrowetting cell 100 and other constructs disclosed herein, the substrate 180 is formed of ceramic or fiberglass mesh infused with resin and is non-transparent. Forming the substrate 180 of these materials can achieve ease of manufacturing, improved electrical consistency of end products, more complex electrode patterns or routings. Surface interconnects and vias are extremely difficult to achieve with a glass substrate, which typically makes it necessary to use ITO with a glass cell. Having the substrate 180 formed of ceramic or fiberglass mesh infused with resin enables the use of vias and planar electrodes to locate connection pads on the outside; and the common electrode can be relocated to the cell substrate and routed through or around the substrate to the connection point. Because side walls 190A-B of a substrate 180 formed of ceramic or fiberglass mesh infused within resin are not transparent, optical anomalies may be alleviated and improved light transmission can be provided. Compared to a substrate 180 formed of ceramic or fiberglass mesh infused within resin, a glass substrate typically requires indium tin oxide (ITO) which can cause a 10% optical loss. ITO is not needed when the substrate 180 is formed of ceramic or fiberglass mesh infused with resin is utilized which may improve light transmission by adding about 10% optical power back to the optical system. Ceramic also has a relatively low coefficient of thermal expansion.

In another example, the substrate 180 can include the second plate 105 in the optically active area 160 supporting the well 110, but also includes ceramic or the fiberglass mesh infused with resin material forming the substrate 180 in lateral regions outside of the well 110. For example, the second plate 105 can be attached via glass frit bonding, which uses localized heat to melt an intermediate layer of frit glass to seal the second plate 105 and the substrate 180 together. As another example, the second plate 105 is adhered to the substrate 180 with suitable adhesive.

The example electrowetting cell construct 100 generally relates to light transmissive electrowetting cells, that is to say cells that act as lenses and/or prisms and are relatively transparent with respect to light that passes entirely through the optically active area of a given cell. Teachings herein may also relate to reflective electrowetting cells. For a reflective cell, a reflector could either be at one end of the well 110. In such a reflective example, the first plate 125 covering the well 110 or the second plate 105 forming the bottom of the well 110 can be reflective instead of transparent material, to provide a reflective electrowetting cell for other types of variable optic applications. Another reflective approach involves forming a reflector at the meniscus forming the interface of the two fluids. Alternatively, one of the fluids may be reflective.

Figure 1B:
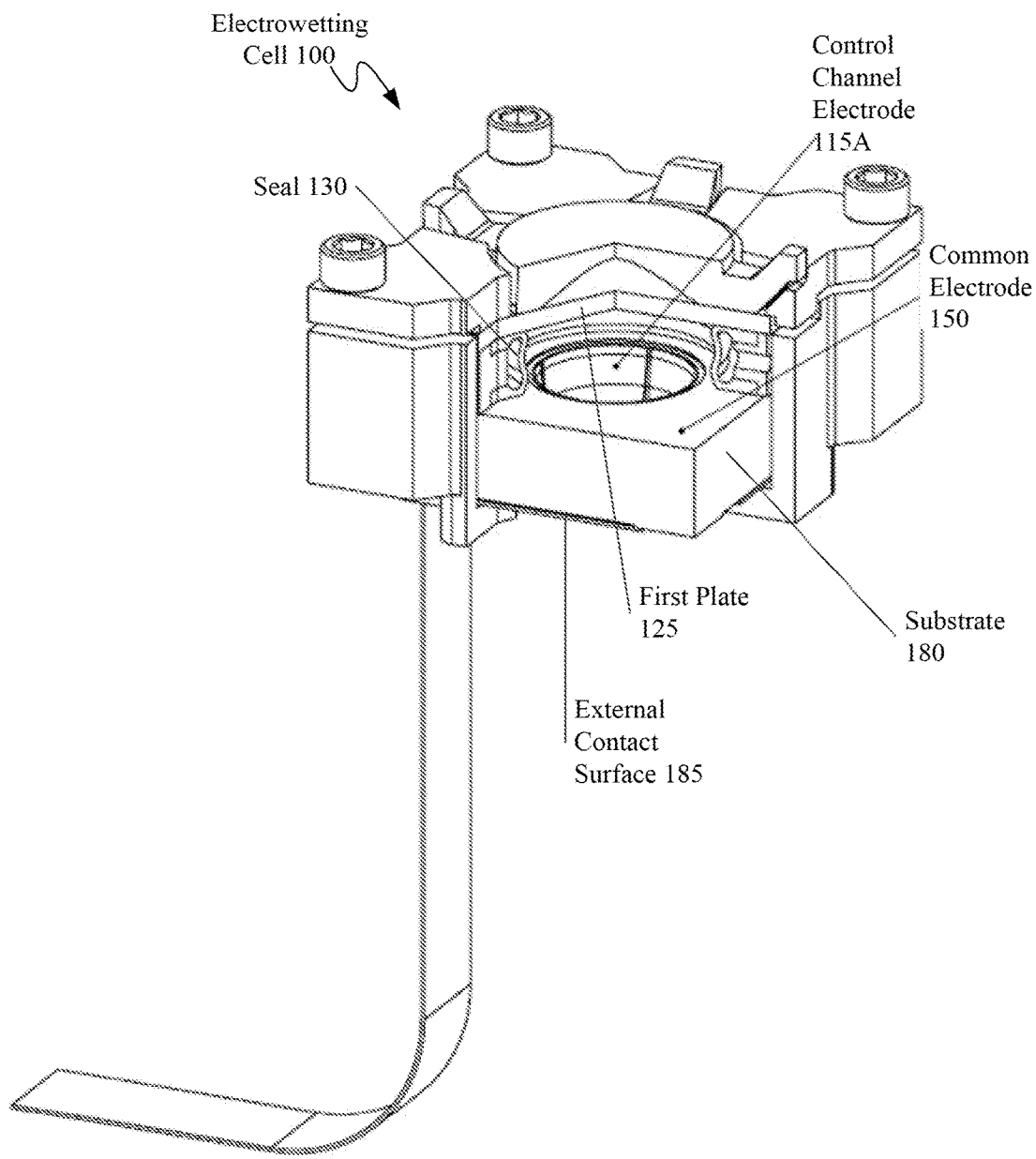
FIG. 1B is a cutaway view of the first electrowetting construct illustrating the substrate, the first plate, and the control channel and common electrodes.
Figure 1C:
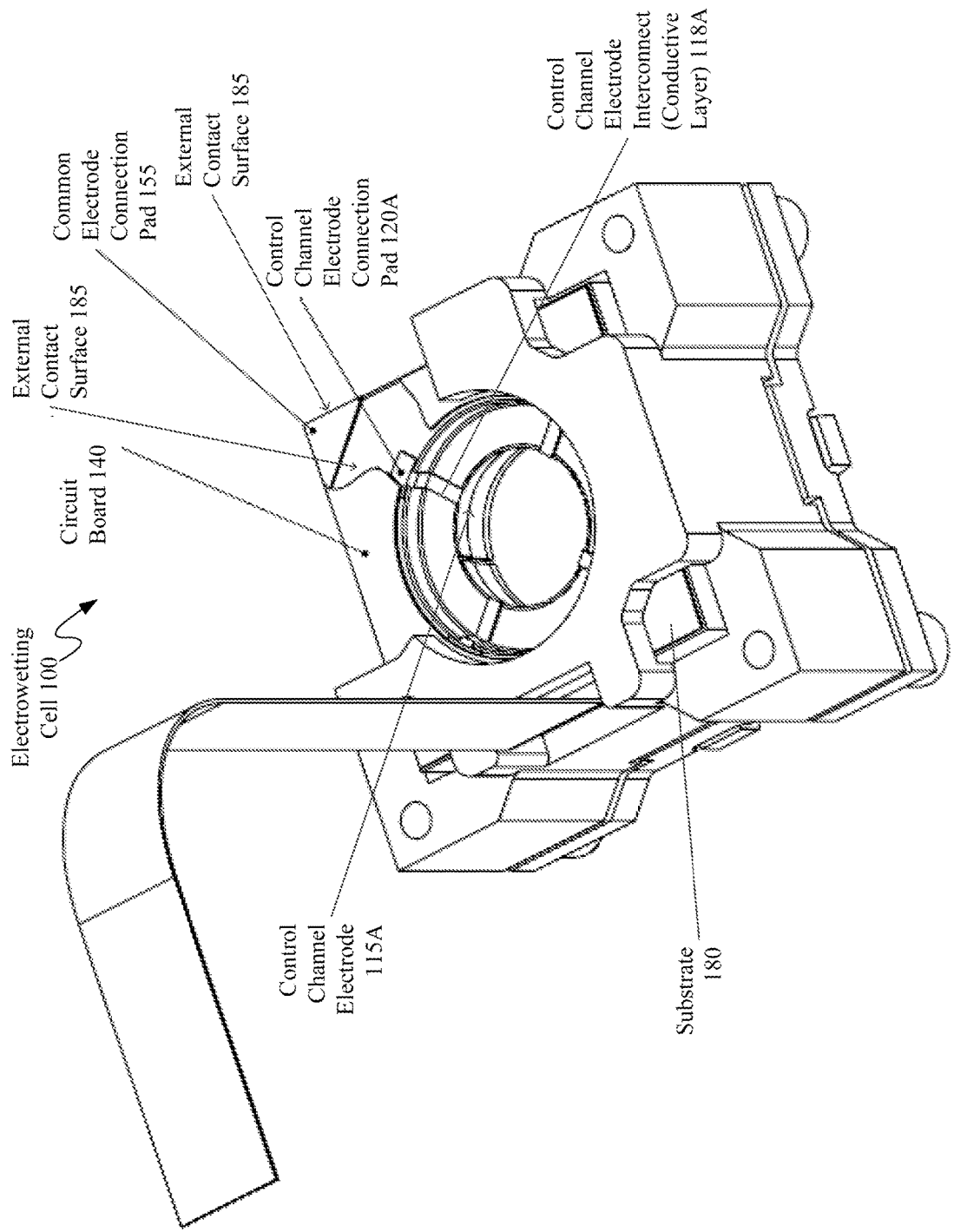
FIG. 1C is a cutaway view of the first electrowetting cell construct which is upside down relative to FIG. 1B and shows the conductive layer interconnects reaching the control channel electrode and common electrode connection pads.

FIG. 1B is a cutaway view of the first electrowetting construct 100 illustrating the substrate 180, the first plate 125, the control channel electrode 115A, and the common electrode 150. FIG. 1C is also a cutaway view of the first electrowetting cell construct 100, but is upside down relative to FIG. 1B. As shown, the control channel electrode interconnect 118A extends between the control channel electrode 115A and the control channel electrode connection pad 120A to provide electrical connectivity to the control channel electrode 115A through the external contact surface 185 of the electrowetting cell 100. The common electrode connection pad 155 is also shown on the external contact surface 185. A common electrode interconnect (not shown) is formed as a conductive layer deposited on side wall 190A that extends between the common electrode 150 and leads to the common electrode connection pad 155 to provide electrical connectivity between the common electrode 150 and the common electrode connection pad 155 through the external contact surface 185.

As shown in FIG. 1C, a circuit board 140 is coupled to the external contact surface 185 and the circuit board 140 includes various circuit connections. The circuit board circuit connections are in electrical contact with the control channel electrode connection pads 120A-B and the common electrode connection pad 155 to supply a driving voltage to the control channel electrodes 115A-B. The circuit board 140 can be a flexible printed circuit board (PCB) that may include dimples to contact the control channel electrode connection pads 120A-B and common electrode connection pad 155. Dimples are compressible depressed or raised areas that may be upward or downward facing. Alternatively, standard flat pads on the circuit board 140 would connect to the control channel electrode connection pads 120A-B and common electrode connection pad 155. In an example, standard FR4 non-flexible PCB type of circuit board 140 with pads connects to the pads 120A-B and 155 on the external contact surface 185, or a non-flexible PCB type of circuit board 140 with pads and pogo pins or other soldered on components is used to create variable height pressure contacts. In another example, an FR4 type or ceramic substrate 180 is reflowed and populated with connectors or pogo pins, etc. before filling to eliminate the need for a solid or flexible PCB for electrical connections to the substrate 180.

Figure 2A:
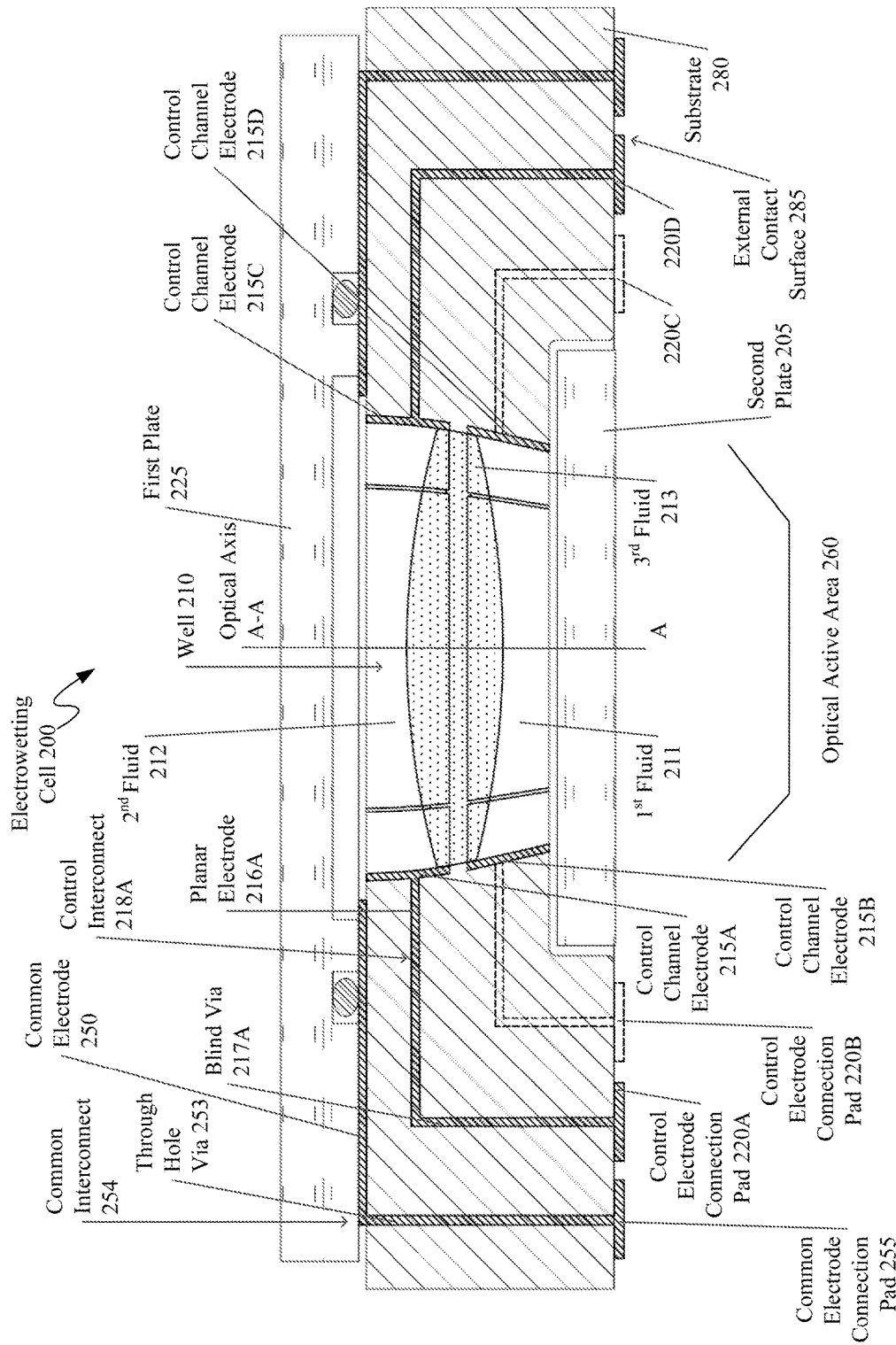
FIG. 2A is a cross-sectional view of parts of an assembled second electrowetting cell construct with three fluids, including a substrate formed of ceramic or fiberglass mesh infused with resin, first and second plates, and via interconnects for control channel and common electrodes.
Figure 2B:
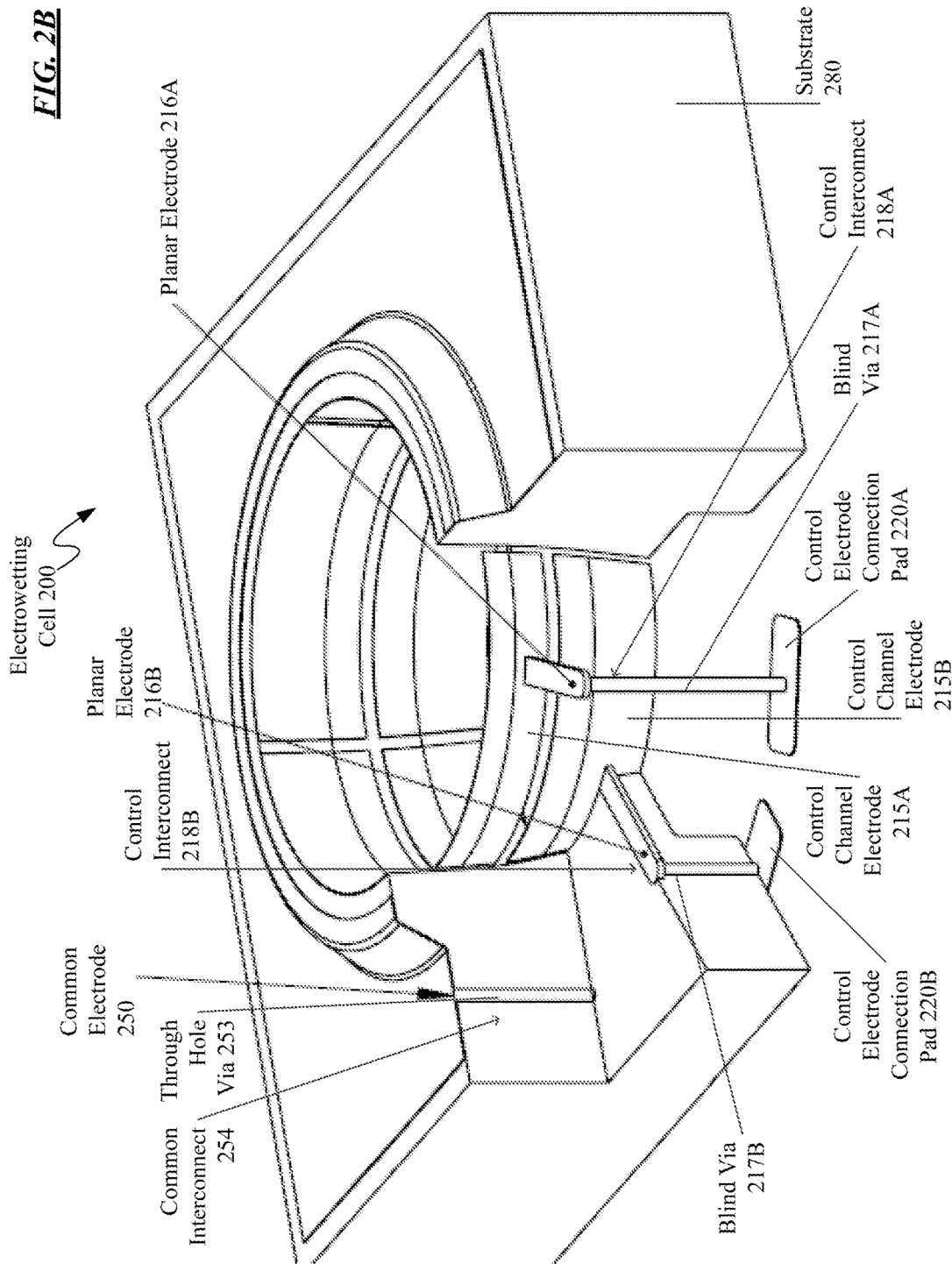
FIG. 2B is a cutaway view of the second electrowetting construct illustrating the substrate, the control channel and common electrodes, blind via interconnects to the control channel electrodes, and a through hole via interconnect to the common electrode.
Figure 2C:
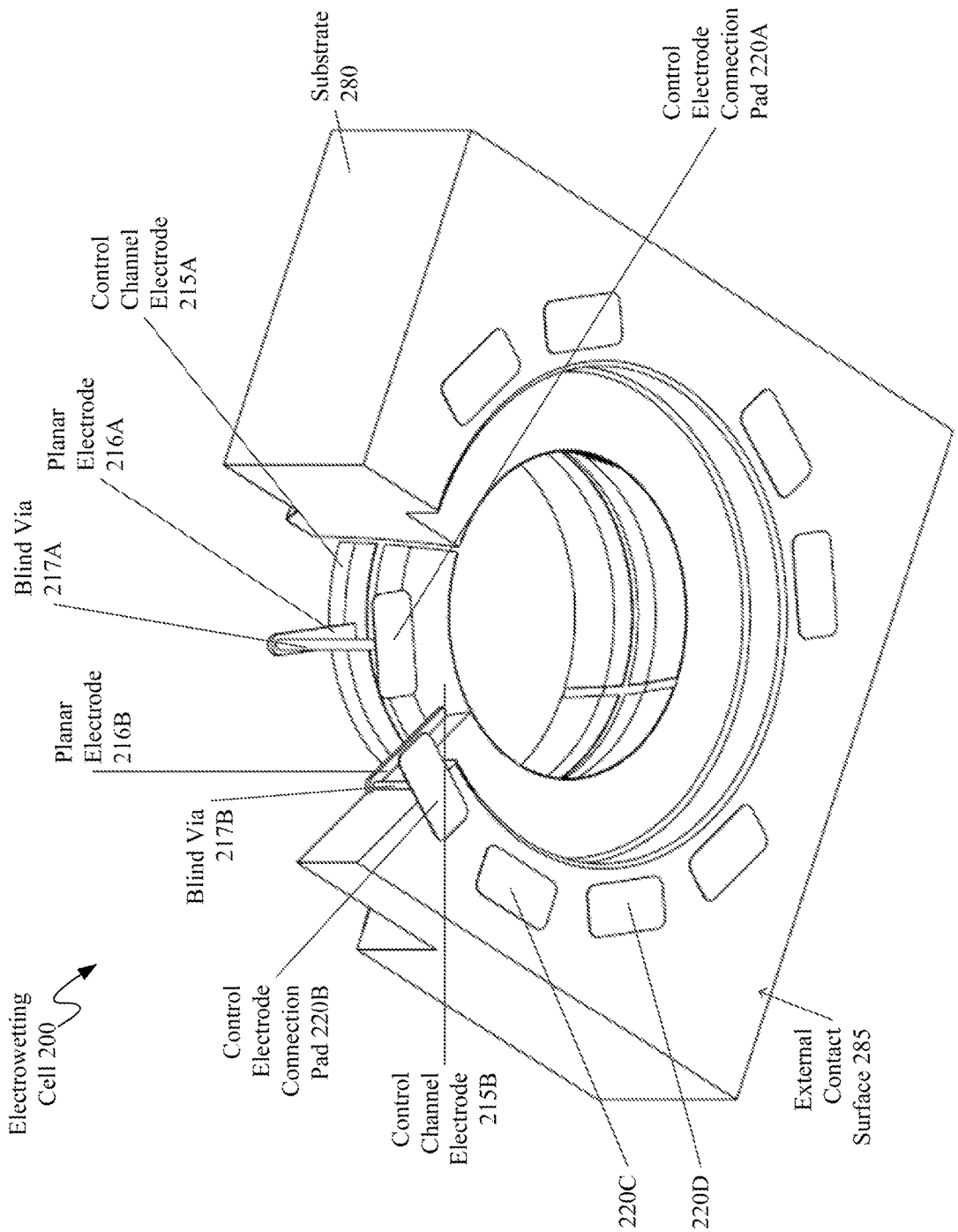
FIG. 2C is a cutaway view of the second electrowetting cell construct which is upside down relative to FIG. 2B and shows the via interconnects reaching the control channel electrode and common electrode connection pads.

FIG. 2A is a cross-sectional view of an assembled second electrowetting cell construct 200. FIG. 2B is a cutaway view of the second electrowetting construct 200. FIG. 2C is also a cutaway view of the second electrowetting cell construct 200, but is upside down relative to FIG. 2B

As shown, the electrowetting cell 200 includes a substrate 280 that supports a well 210 filled with three fluids 211-113 in a middle portion and that includes an external contact surface 285 that is outside of the electrowetting cell 200. Having three fluids 211-213 enables the electrowetting cell 200 to be utilized as a dual lens, where the first fluid 211 and second fluid 212 are non-conductive and the third fluid 213 is conductive and surrounded by the first fluid 211 and second fluid 212. A plurality of control channel electrode connection pads 220A-D and a common electrode connection pad 255 are formed on the external contact surface 285. A first plate 225 is coupled to the substrate 280 to seal a first end of the well 210 and a second plate 205 is coupled to the substrate 280 to seal a second end of the well 210. One or both of the first plate 225 and the second plate 205 can be transparent. Control channel electrodes 215A-D are formed to control a shape of the conductive fluid 213 via an electric field. A common electrode 250 is located to contact the non-conductive fluid 212 and is connected to a common electrode interconnect 254.

Substrate 280 includes a respective control channel electrode interconnect (218A is labeled in FIG. 2A, the remaining are not for ease of illustration) extending between and connected to each respective control channel electrode 215A-D and a respective control channel electrode connection pad 220A-D. In the visible cross-section illustrated in the example, electrowetting cell 200 includes four control channel electrode interconnects and four control channel electrodes 215A-D. Although not completely visible, it should be understood that, in total, there are eight control channel electrodes and eight respective control channel electrode interconnects, four of which the cross-section intersects and cuts through. Two additional control channel electrodes are visible on the back wall of the well 210, and two of the eight control channel electrodes are not visible in the depicted cross-section. The two additional control channel electrodes that are not visible in the cross-section are formed on the opposing side of the well 210 of the second electrowetting cell construct 200.

The control channel electrode interconnect 218A may also include at least one respective control channel electrode via formed in the substrate 280 that extends between the respective control channel electrode connection pad 220A and the respective control channel electrode 215A.

A control channel electrode interconnect can include one or more conductive traces, such as a planar electrode, that extends to and intersects one or more vias, such as a blind via, that leads to a respective control channel electrode connection pad. A via is the resulting passage (e.g., hole) through the substrate 280 formed by the hole and also includes the metallization, pin, or other conductive medium/material that is within and fills the passage. In other words, a via includes the passage and the conductive material that fills the passage to provide electrical connectivity.

In the example, the control channel electrode interconnect 218A includes an internal conductive trace, shown as planar electrode 216A, and an interconnected blind via 217A that are oriented in different directions but that intersect,. The planar electrode 216A and the blind via 217A can be variable in size (e.g., length, width, thickness, etc.). It can be seen in FIG. 2A that a respective control channel electrode interconnect is formed that extends between each of the remaining control channel electrodes 215B-D and respective control channel electrode connection pads 220B-D.

A horizontally formed conductive trace, such as the planar electrode 216A can be formed by, for example, layering of the substrate 280 formed of ceramic or fiberglass mesh infused with resin. For example, by plating that plane of the substrate 180 with metal, etc. before stacking more layers of substrate 280 on top of it. Via constructs can be formed by machining before the plating steps.

The planar electrode 216A is formed parallel (e.g., horizontally in FIG. 2A) to the substrate 280 and the blind via 217A is formed perpendicular (e.g., vertically in FIG. 2A) to the substrate 280. The planar electrode 216A and blind via 217A forming the control channel electrode interconnect 218A provide electrical connectivity between the control channel electrode 215A and the control channel electrode connection pad 220A. As an alternative to the planar electrode 216A and blind via 217A, a through hole via can be formed between the control channel electrode 215A and the control channel electrode connection pad 220A.

The substrate 280 also includes a common electrode interconnect 254 that may include at least one common electrode via formed in the substrate 280 that extends between the common electrode connection pad 255 and the common electrode 250. In the example of FIG. 2B, the common electrode interconnect 254 includes at least one through hole via 253. The through hole via 253 is formed at least substantially parallel to an optical axis A-A of the electrowetting cell 200 through the first plate 225, the second plate 205, and the well 210. Although shown as formed perpendicular to the substrate 280, it should be understood that vias, such as through hole via 253 and blind via 217A, may be non-linear or formed at angles other than 90° with respect to the substrate 280, including 70°, 80°, etc. The common electrode interconnect 254 provides electrical connectivity between the common electrode 250 and the common electrode connection pad 255.

Of note, the substrate 280 can be formed to include a plurality of ceramic or fiberglass mesh infused with resin layers and at least part of the control channel electrode interconnect 218A and/or the common electrode interconnect 254 can be formed as a conductor between two or more of the layers of the substrate 280. Also in the depiction of FIG. 2A, it can be seen that two sets of the plurality of control channel electrodes 215A-D are at different heights on side walls of the well 210. For example, control channel electrodes 215A and 215C are at a first height and control channel electrodes 215BC are at a second height that is relatively lower than the first height.

Figure 3A:
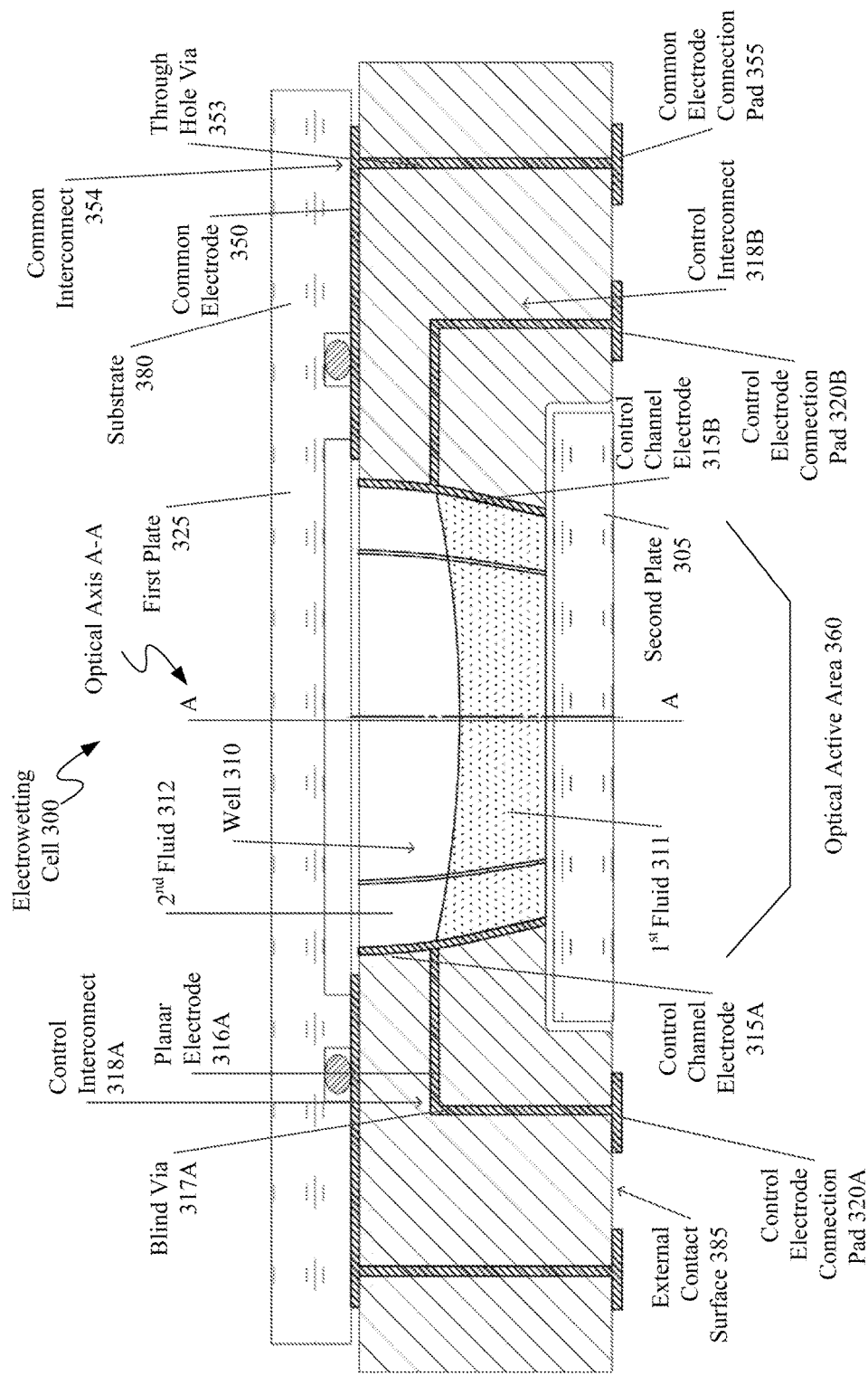
FIG. 3A is a cross-sectional view of parts of an assembled third electrowetting cell construct with two fluids, including a substrate formed of ceramic or fiberglass mesh infused with resin, first and second plates, and via interconnects for control channel and common electrodes.

FIG. 3A is a cross-sectional view of an assembled third electrowetting cell construct 300. FIG. 3B is a cutaway view of the third electrowetting construct 300. FIG. 3C is also a cutaway view of the third electrowetting cell construct, but is upside down relative to FIG. 3B. The electrowetting cell 300 includes a substrate 380 that supports a well 310 filled two fluids 311 and 312 in a middle portion and that includes an external contact surface 385 that is outside of the electrowetting cell 300. A plurality of control channel electrode connection pads 320A-B are formed on the external contact surface 385. A common electrode connection pad 355 is also formed on the external contact surface 385.

Electrowetting cell 300 includes a first plate 325 coupled to the substrate 380 to seal a first end of the well 310 and form a transparent window at one axial end of the well 310. A second plate 305 is coupled to the substrate 380 to seal a second end of the well 310 and form a transparent cover window at an opposite axial end of the well 310.

As shown, the electrowetting cell 300 includes a plurality of control channel electrodes 315A-B to control the two fluids 311 and 312 via separately controllable electric fields. Each of the control channel electrodes 315A-B are mounted to the substrate 380 on a wall of the well 310. A common electrode 350 is located on the substrate 380 to contact a conductive one of the fluids 311 and 312.

A respective control channel electrode interconnect 318A-B is connected to each respective control channel electrode 315A-B and a respective control channel electrode connection pad 320A-B. As shown, a control channel electrode interconnect 318A that comprises a planar electrode 316A and a blind via 317A extends between control channel electrode 315A and control channel electrode connection pad 320A. Another control channel electrode interconnect 318B is also formed that includes a planar electrode and a blind via extending between control channel electrode 315B and control channel electrode connection pad 320B. The control channel electrode interconnects 318A-B are a conductive medium to provide electrical connectivity between the respective control channel electrodes 315A-B and the respective common electrode connection pads 320A-B.

A common electrode interconnect 354 is connected to the common electrode 350 and the common electrode connection pad 355. The common electrode interconnect 354 provides electrical connectivity between the common electrode 350 and the common electrode connection pad 355 and extends between the common electrode 350 and the common electrode connection pad 355. The common electrode interconnect 354 of electrowetting cell 300 includes a through hole via 353.

Alternatively or additionally to using blind vias, the control channel electrode interconnects 318A-B may include a through hole via. For example, the through hole via is formed at least substantially parallel to an optical axis A-A of the electrowetting cell 300 through the first plate 325 and the second plate 305 and the well 310 similar to the through hole via 353 that forms the common electrode interconnect 354.

As an alternative to using vias, the control channel electrode interconnects 318A-B can be a conductive layer deposited on a surface of the substrate 380 that leads to respective control channel electrode connection pads 320A-B like that shown and described in FIGS. 1A-C. In this example, the control channel electrode interconnects 318A-B provide electrical connectivity between the respective control channel electrode 315A-B and the respective control channel electrode connection pad 320A-B, but are routed via surfaces of the substrate 380 that are adjacent and aligned with the second plate 305 and/or side walls of the substrate 380 instead of through the internal ceramic or fiberglass mesh infused with resin layers of the substrate 380.

As shown in FIG. 3C, a circuit board 340 is coupled to the external contact surface 385. The circuit board 340 has circuit connections in electrical contact with the respective control channel electrode connection pad 320A-B and the common electrode connection pad 355 to supply a drive signal to the respective control channel electrode 315A-B. Although not shown, an optical/electrical transducer can be optically coupled to the electrowetting cell 300 to send or receive light through the two immiscible fluids 311-312 in the well. A processor (also not shown) can be coupled to the electrowetting cell 300 and the optical/electrical transducer.

FIG. 4 is an assembled fourth electrowetting cell construct 400. The example of FIG. 4 is a combination of that described and depicted in FIGS. 1A-C and FIGS. 3A-C. Like FIGS. 3A-C, the electrowetting cell 400 has a control channel electrode interconnect 418A formed of that is formed with a planar electrode 416A and a blind via 417A. However, like FIGS. 1A-C the common electrode interconnect 454 is a conductive layer deposited on at least one surface of the substrate 480 that leads to the common electrode connection pad 455 to provide electrical connectivity between the common electrode 450 and the common electrode connection pad 455. In the example, the common electrode interconnect 454 is deposited on surfaces including both side walls 490A-B and the external contact surface 485.

Figure 5:
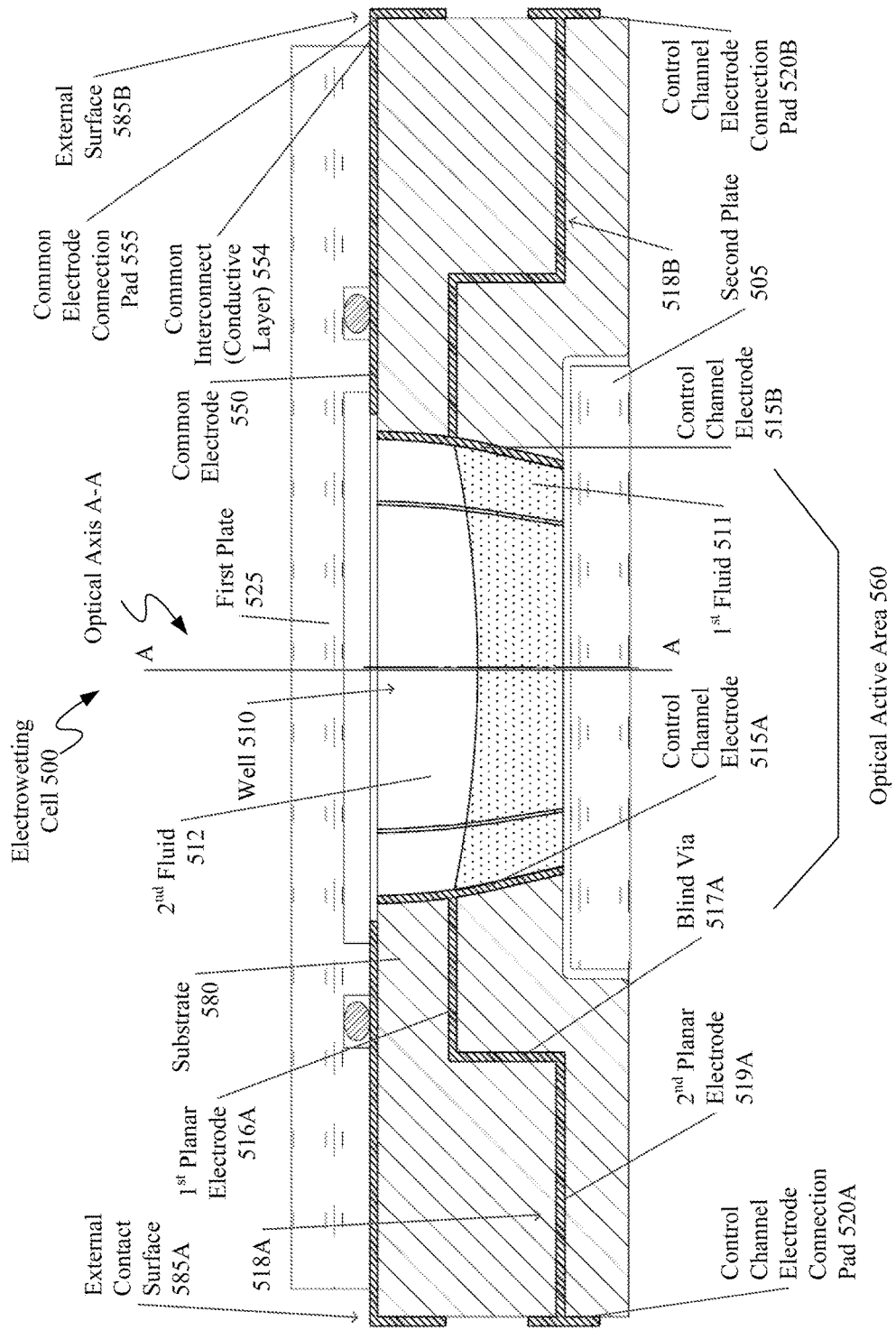
FIG. 5 is an assembled fifth electrowetting cell construct with two fluids, including a substrate formed of ceramic or fiberglass mesh infused with resin, first and second plates, a conductive layer interconnect for a common electrode, via interconnects for control channel electrodes, where an external contact surface for the electrode connection pads is located is in a different position than the first to fourth constructs.

FIG. 5 is an assembled fifth electrowetting cell construct 500. In this example, respective control channel electrode interconnects 518-B are formed in the substrate 580 on opposing sides of the well 510. A first control channel electrode interconnect 518A extends between the control channel electrode connection pad 520A and the control channel electrode 515A. The first control channel electrode interconnect 518A includes a first internal conductive trace, shown as first planar electrode 516A; a blind via 517A; and a second internal conductive trace, shown as second planar electrode 519A that are interconnected. The first planar electrode 516A is formed perpendicular to the optical axis A-A and parallel to the substrate 580, the blind via 517A is formed parallel to the optical axis A-A and perpendicular to the substrate 580, and the second planar electrode 519A is formed perpendicular to the optical axis A-A and parallel to the substrate 580. It can be seen that a second control channel electrode interconnect 518B similarly extends between the control channel electrode connection pad 520B and the control channel electrode 515B and is formed of similarly interconnected conductive media, including two planar electrodes and a blind via. The respective control channel electrode interconnects 518-B extend to a respective external contact surface 585A-B which are actually side walls of the substrate 580. As shown, respective control channel electrode connection pads 520A-B are formed on the respective external contact surface 585A-B for the respective control channel electrode 515A-B.

A common electrode interconnect 554 is formed as a conductive layer extending between the common electrode 550 and the common electrode connection pad 555. The common electrode interconnect 554 run extends partially down the external contact surfaces 585A-B to reach the common electrode connection pad 555, but the run terminates before reaching the control channel electrode connection pads 520A-B formed on the external contact surfaces 585A-B.

The examples in the drawings and described above include an integrated approach to the construction of an electrowetting cell that incorporates all circuits and connection pads into the cell to form one component. This can be accomplished through a layered circuit board approach using ceramic or fiberglass mesh infused with resin, that accommodates the use of through hole vias, blind vias, and multilayered circuits. This can also be accomplished with a solid substrate using ceramic or fiberglass mesh infused with resin, that accommodates the addition of electrical traces, contacts, and vias, for example.

Figure 6A:
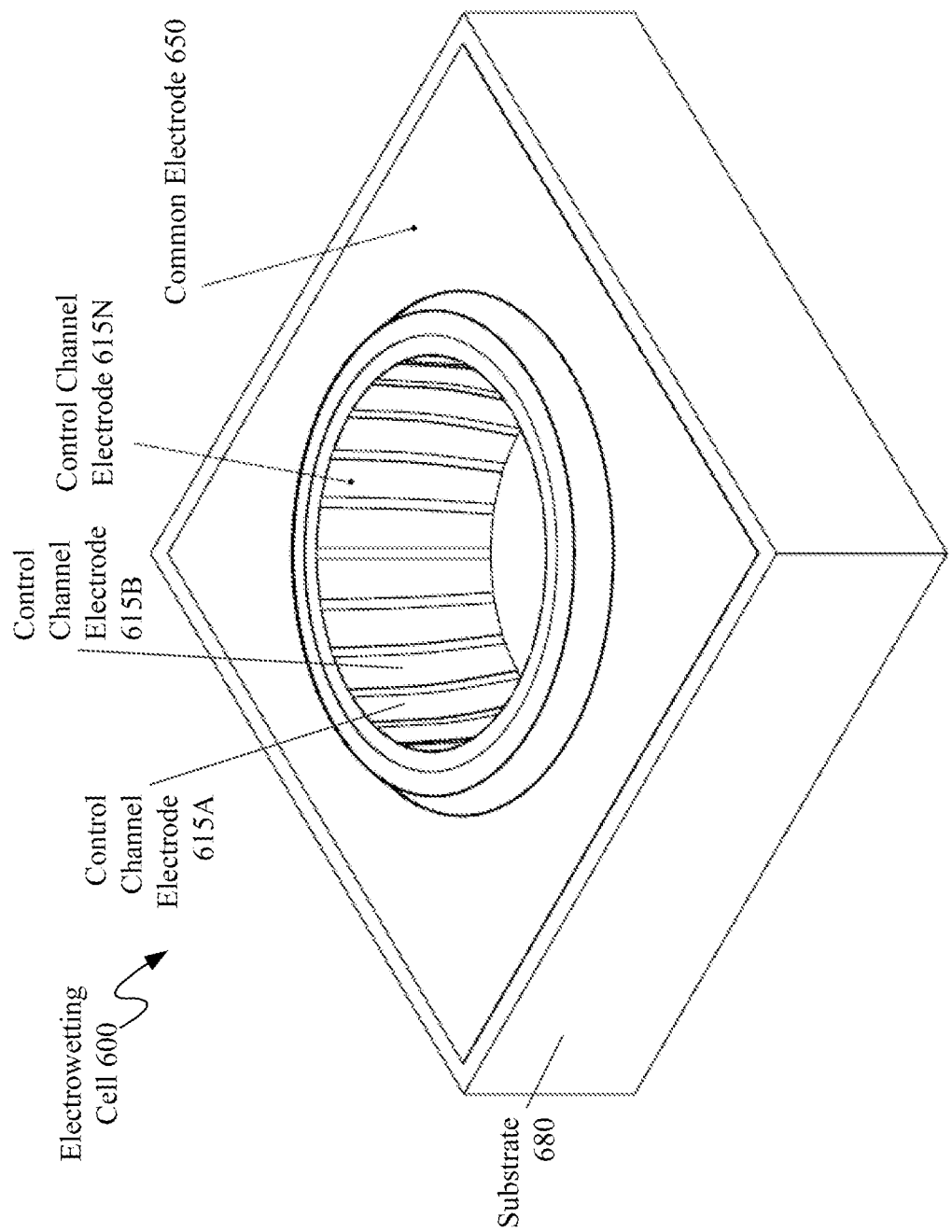

FIG. 6A depicts an isometric view of an electrowetting cell 600 having a substrate 680 formed of ceramic or fiberglass mesh infused with resin and highlights a higher density radial pattern of control channel electrodes 615A-N are possible with the electrowetting cell constructs described herein. In the example electrowetting cell 600 of FIG. 6A, twenty control channel electrodes are formed. However, the number of control channel electrodes is not limited to twenty, and can be either increased or decreased as desired for an application with the same basic principles being used. A common electrode 650 is also shown.

FIG. 6B depicts an isometric view of the same electrowetting cell 600 with the substrate 680 shown in FIG. 6A. However, FIG. 6B highlights how the higher density of control channel electrodes 615A-N shown in FIG. 6A can have corresponding control channel electrode connection pads 620A-N laid out on an external contact surface 685 of the substrate 680. This array or pattern is not required for the electrowetting cell 600 construct to function and can be laid out with any size, shape, or location of the pads as an application requires.

Figure 7:
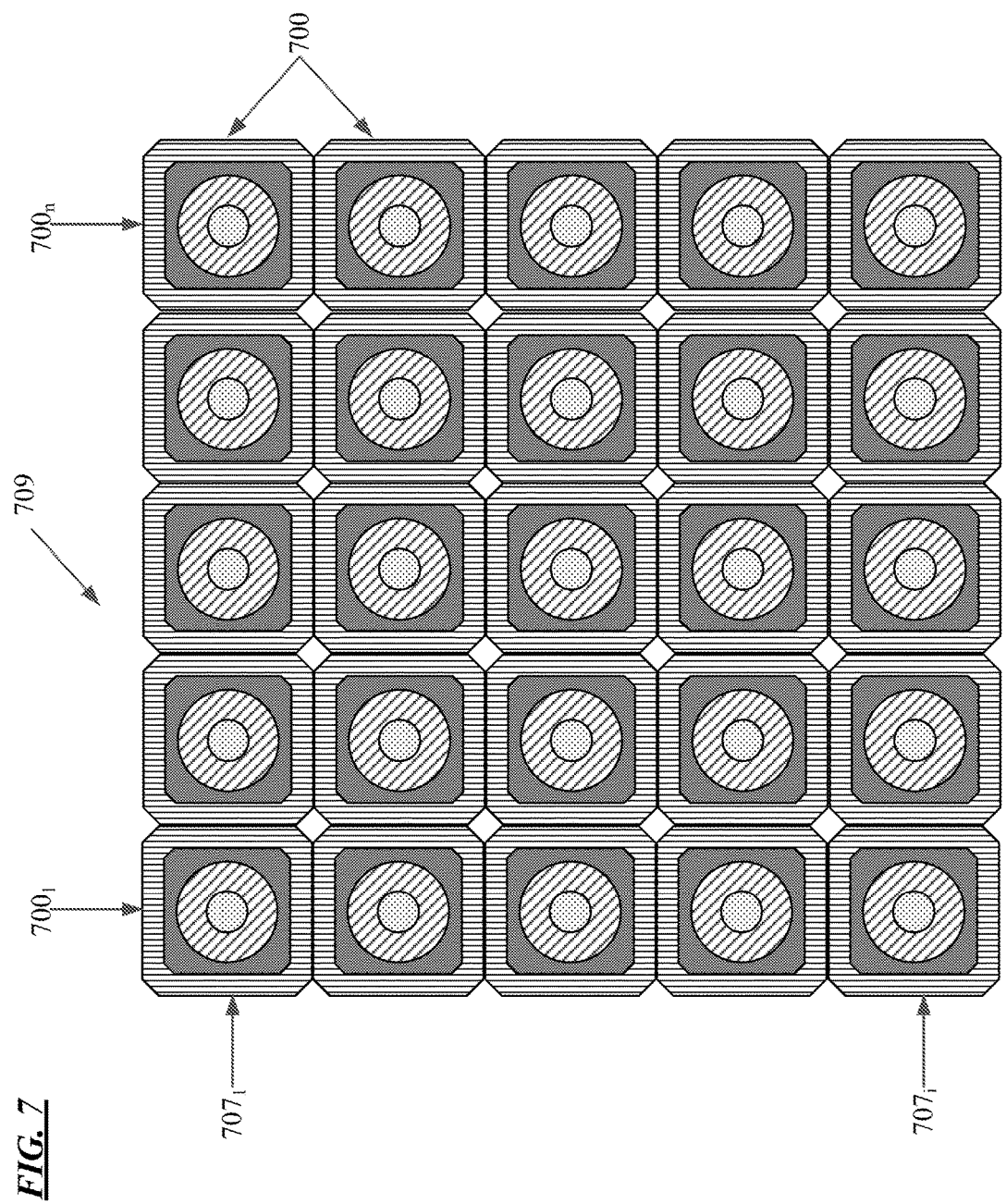
FIG. 7 depicts an assembly of electrowetting cells forming a row-and-column matrix for an array of electrowetting cells.

FIG. 7, for example, depicts assembly of a number of rows $707_1$ to $707_i$ of electrowetting cells 700 to form an array 709. Each of the i rows $707_1$ to $707_i$ includes a number n of cells $700_1$ to $700_n$. In this manner, the cells form an ixn row-and-column matrix for the array 709 of electrowetting cells 700. Although not shown, suitable leads would connect to the flexible PCB tails of the various cells 700 to 700n of the rows $707_1$ to $707_i$ forming the array 709. For example, the leads may form a bus system connecting all of the cells of the array in common, e.g. to a single driver circuit and associated controller. In such an electrical arrangement all of the ixn electrowetting cells 700 would be controlled in common. Various other connection arrangements may be used, e.g. to control each cell independently with connections to a separate driver for each cell of the matrix, to control each row independently with connection of each row to a separate driver, or to control various sub-matrices of the array independent of each other (but with all of the cells in a given sub-matrix connected together and commonly controlled) with a separate driver connected to each sub-matrix.

In the example, the driver is separate from the cell(s) driven by the respective driver. Alternatively, the driver(s) may be more closely associated with respective cell(s). For example, some or all of the driver circuitry for a particular cell might be implemented on the flexible circuit board of the cell.

Figure 8:
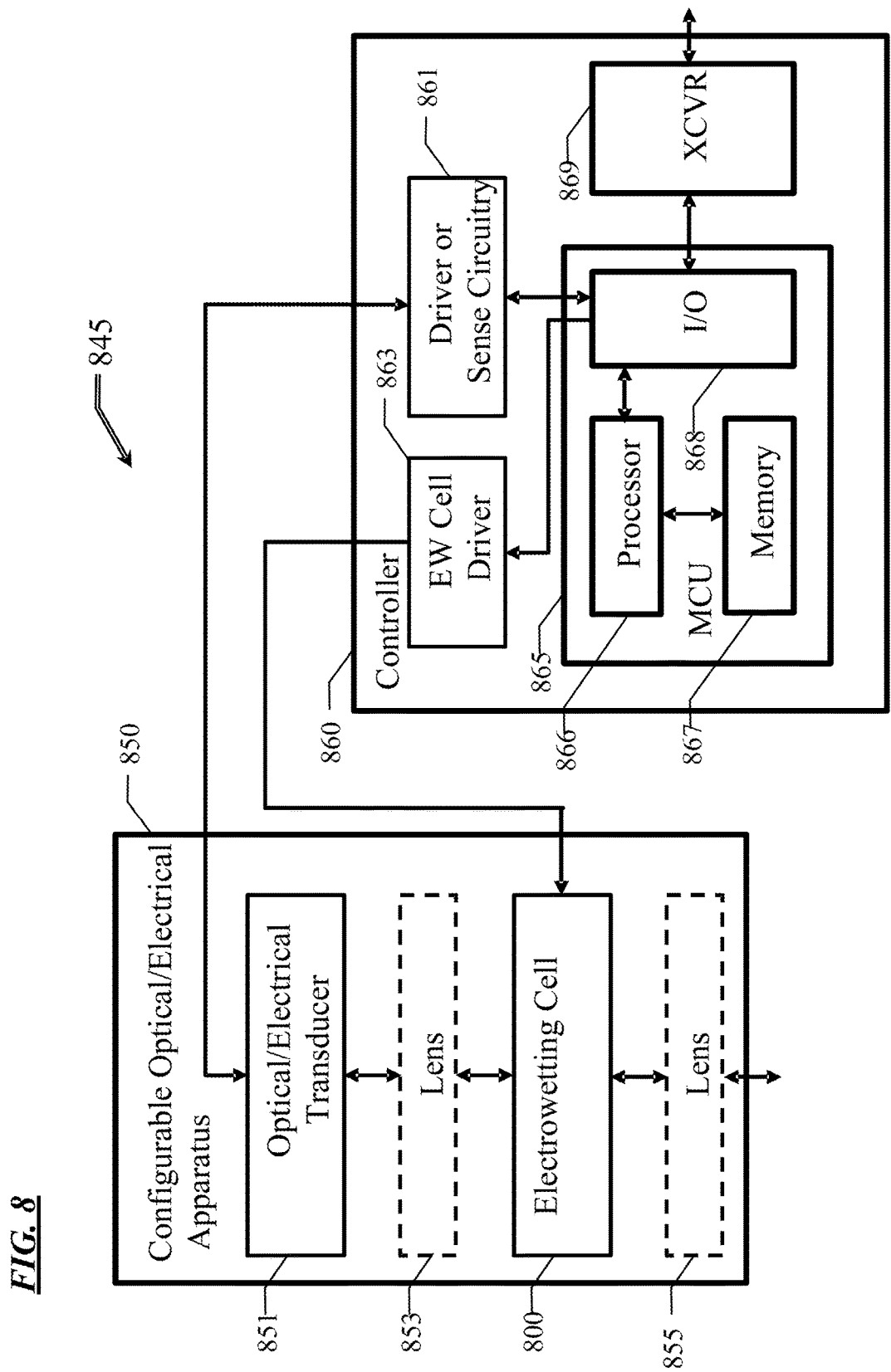
FIG. 8 is a simplified functional block diagram of a system combining an electrowetting cell like that described with an optical/electrical transducer and associated circuitry.

FIG. 8 is a simplified functional block diagram of a system 845, which includes a configurable optical/electrical apparatus 850 and a controller 860. The configurable optical/electrical apparatus 850 combines an electrowetting cell like that described above with an optical/electrical transducer 851. Although associated circuitry may be provided in the apparatus 850, the example shows circuitry in the controller 860, which may be somewhat separate from or even remote from the configurable optical/electrical apparatus 850.

An optical/electrical transducer 851 is a device that converts between forms of optical and electrical energy, for example, from optical energy to an electrical signal or from electrical energy to an optical output. Examples of optical-to-electrical transducers include various sensors or detectors, photovoltaic devices and the like. Optical-to-electrical transducers discussed herein are responsive to light, and the light may be visible light, ultraviolet light, infrared, near infrared or light in other portions of the optical spectrum.

Examples of electrical-to-optical transducers include various light emitters, although the emitted light may be in the visible spectrum or in other wavelength ranges. Suitable light generation sources for use as the transducer 851 include various conventional lamps, such as incandescent, fluorescent or halide lamps; one or more light emitting diodes (LEDs) of various types, such as planar LEDs, micro LEDs, micro organic LEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used to implement the transducer 851. For example, it should be understood that non-micro versions of the foregoing light generation sources can be used.

When optical transducer 851 is a light source, the light source may use a single emitter to generate light or may combine light from some number of emitters that generate the light. A lamp or 'light bulb' is an example of a single source. An LED light engine may use a single output for a single source but typically combines light from multiple LED type emitters within the single light engine. Many types of light sources provide an illumination light output that generally appears uniform to an observer, although there may be some color or intensity striations, e.g. along an edge of a combined light output. For purposes of the present examples, however, the appearance of the light source output may not be strictly uniform across the output area or aperture of the source. For example, although the source may use individual emitters or groups of individual emitters to produce the light generated by the overall source; depending on the arrangement of the emitters and any associated mixer or diffuser, the light output may be relatively uniform across the aperture or may appear pixelated to an observer viewing the output aperture. The individual emitters or groups of emitters may be separately controllable, for example to control intensity or color characteristics of the source output. As such, the light source used as an emitter type of optical/electrical transducer 851 may or may not be pixelated for control purposes. The electrowetting cell 800 is controlled to selectively optically change or spatially (optically) modulate the light distribution output from the transducer and thus from the apparatus 850. The electrowetting cell 800 may support controlled beam steering, controlled beam shaping or a combination of controlled beam steering and shaping.

In another example, optical transducer 851 is an optical-to-electrical converter, that is to say, a light sensor or detector or a photovoltaic device. The overall apparatus 850 in such a case may be configured as an imager, other light responsive sensor, light responsive power source, or the like. The light detector may be an array of light detectors, a photo-detector such as a photodiode, or a photovoltaic device, depending on the desired function of optical/electrical apparatus 850. Other suitable light detectors for use as optical/electrical transducer 851 include charge-coupled device (CCD) arrays, complementary metal-oxide-semiconductor (CMOS) arrays, photomultipliers, image intensifiers, phototransistors, photo resistors, thermal imagers, and micro-electromechanical systems (MEMS) imagers. Nonetheless, virtually any detector of light may be used as the transducer 851 in an optical-to-electrical arrangement of apparatus 860. Suitable light detectors will be known to one of ordinary skill in the art from the description herein. The electrowetting cell 800 is controlled to selectively optically change or spatially (optically) modulate the field of view of light coming into the apparatus 850 for delivery to transducer 851. The electrowetting cell 800 may support controlled beam steering, controlled beam shaping or a combination of controlled beam steering and shaping, with respect to light from a field of intended view for the particular optical-to-electrical application of the apparatus 850.

While light source examples and light detector examples are described separately, it will be understood that both types of optical/electrical transducers 851 may be present in a single optical apparatus 850 and/or some optical transducers can serve both input and output functions (e.g. some LEDs can be multiplexed between the emitting operation and a light detection operation). Such a combined arrangement or operation, for example, may advantageously provide capabilities to reconfigure the light output distribution in accordance with a desired light detection pattern.

In an overall apparatus 850, with an optical/electrical transducer 851, the electrowetting cell 800 may have a lens on one side or the other side or have lenses on both sides, of the electrowetting cell 800, along the axis of the optical path through the cell 800 and to or from the transducer 851. Hence, FIG. 8 shows a dotted line (optional) example of a lens 853 between the transducer 851 and the electrowetting cell 800. Similarly, FIG. 8 shows a dotted line (optional) example of a lens 855 on the side of the electrowetting cell 800 opposite the transducer 851. In the example, the lenses 851 or 853 would be fixed lenses.

Various examples of arrangements of a spatial optical modulator (e.g. as an electrowetting cell) with one or more cascaded lenses are disclosed in U.S. patent application Ser. No. 15/228,414, filed Aug. 4, 2016, entitled "Configurable Optical Transducers Using An Optical Modulator And One Or More Lenses," the disclosure of which is entirely incorporated by reference.

Although not shown, additional optical processing elements may be provided in the apparatus 850. In a luminaire for general illumination or in another type of light emission device (e.g. a flash), an emitter type transducer 851 may be coupled to the electrowetting lens 100 via a collimating optic, such as a total internal reflection (TIR) lens.

A transducer 851, such as a light emitter or a light detector, often connects to corresponding electrical circuitry to operate the particular type of transducer, e.g. a driver circuit to supply power to an emitter or a sense circuit to process an output signal from a detector (and provide power to the detector if necessary). Hence, to operate the transducer 851, the controller 860 includes corresponding driver or sense circuitry 861. The type of circuitry 861 would depend on the type of transducer 851.

The controller 1260 includes an electrowetting (EW) driver 863 to selectively provide signals to the electrodes (e.g. voltages between respective control channel electrodes and the common electrode) to control the fluid state of the electrowetting cell 800. The driver 863, for example, may be circuitry constructed/configured to apply direct current (DC) voltages or alternating current (AC) voltages or AC with a DC offset to the cell electrodes. In the example 800 of the cell above, having four control channel electrodes and a common electrode, the EW driver 863 would have four separately controllable voltage output channels each having a connection through a respective contact to a respective one of the control channel electrodes. Each separately controllable voltage output channel of the EW driver 863 would also have a connection through the common contact to the common electrode of the electrowetting cell 800. Configuration of the circuitry of the EW driver 863 would be adapted to the particular electrical control strategy (e.g. to use AC, DC or a combination of AC and DC), the intended range(s) of fluid states and thus to the beam steering and/or shaping capabilities of the electrowetting cell 800, and/or to any voltage or current limitations intended to minimize damage to the cell structure of components thereof during operation of the system 845.

The controller 860 also includes a processor, one or more digital storage media, data and programming in the storage and appropriate input/output circuitry. Although other processor based architectures may be used (another example is described later regarding FIG. 9), the example of controller 860 utilizes a Micro-Control Unit (MCU) 865, which implements the control logic for the controller 860 and thus of the system 845. For example, the MCU 865 implements the logic for control of operations of the associated optical/electrical apparatus 850. Although shown as controlling only one such apparatus 850, the MCU and controller may control a number of such apparatuses 850.

The MCU 865 may be a microchip device that incorporates a processor 866 serving as the programmable central processing unit (CPU) of the MCU 865 as well as one or more memories, represented by memory 867 in the drawing. The memory 867 is accessible to the processor 866, and the memory or memories 867 store executable programming for the CPU formed by processor 866 as well as data for processing by or resulting from processing of the processor 866. The MCU 865 may be thought of as a small computer or computer like device formed on a single chip. Such devices are often used as the configurable control elements embedded in special purpose devices rather than in a computer or other general purpose device. A variety of available MCU chips, for example, may be used as the MCU 865 in the controller 860 of system 845.

The MCU 865 in this example also includes various input and output (I/O) interfaces, shown collectively by way of example as interface 868 in FIG. 8. The I/O interfaces 868, for example, support a control output to the EW cell driver 863 as well as a control output and/or input to the driver or sense control circuitry 861 (for the optical/electrical transducer 851). The I/O interfaces 868 also support input/output communications with one or more electronic devices, which may be connected to or incorporated in the system 845 (e.g. to provide a user interface not shown) or which may be remote.

In the illustrated example, the controller 860 also includes a communication transceiver (XCVR) 869 coupled to the processor 166 (and possibly to the memory 867) via an I/O output interface 868 of the MCU 865. Although shown separately, the transceiver 869 may be implemented in circuitry on the same chip as the elements of the MCU 865. Although the drawing shows only one transceiver 869, controller 860 may include any number of transceivers, for example, to support additional communication protocols and/or provide communication over different communication media or channels.

The transceiver 869 supports communication with other control or processing equipment, for example, with a remote user interface device and/or with a host computer of a building control and automation system (BCAS). The transceiver 869 may also support system communication with a variety of other equipment of other parties having access to the system 845 in an overall/networked system encompassing a number of similar systems 845, e.g. for access to each system 845 by equipment of a manufacturer for maintenance or access to an on-line server for downloading of programming instructions or configuration data for setting aspects of sensing or lighting operation of the associated optical/electrical apparatus(s) 850. The circuitry of the transceiver 869 may support such communication(s) over any available medium, such as wire(s), cable, optical fiber, free-space optical link or radio frequency (RF) link.

Figure 9:
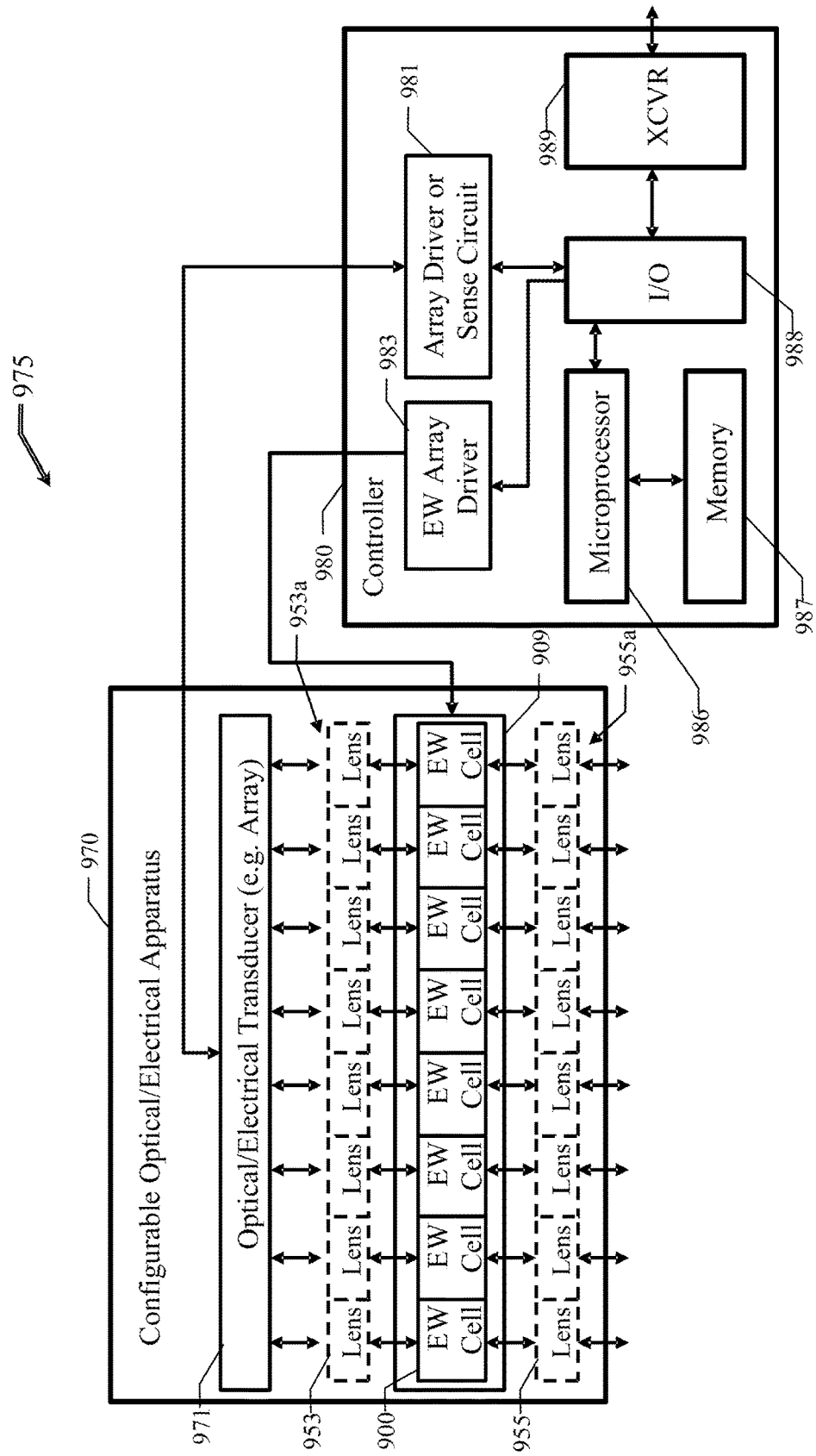
FIG. 9 is a simplified functional block diagram of a system combining an electrowetting cell array like that of FIG. 7 with one or more optical/electrical transducers and associated circuitry.

FIG. 9 is a simplified functional block diagram of a system 975 combining an electrowetting cell array 909 like that of FIG. 7 with one or more optical/electrical transducers 971 (combined in a configurable optical/electrical apparatus 970). The drawing also depicts an example of associated circuitry, which is implemented in a controller 980. The electrowetting cellular array 909 is used to provide selectively controllable beam steering and/or beam shaping for any of a variety of types of optical/electrical transducers 971, including both light detectors and light emitters. The controller 980 may be included in the apparatus 970, or the controller 980 may be somewhat separate from or even remote from the configurable optical/electrical apparatus 970.

The optical/electrical transducer 971 may be any transducer device of the types discussed above, although the transducer 971 is configured to operate with an array 909 of electrowetting cells 900. Although the transducer 971 may be a single device, e.g. a single relatively large light source, in many examples, transducer 971 is an array of emitters and/or lighting input responsive devices (e.g. detectors or photovoltaic devices). In a luminaire example using the apparatus 970, the transducer 971 might include an array of high intensity LED light emitters, where each one of the emitters is coupled to one or more of the cells 900 of the array 909. In a detector example using the apparatus 970, the transducer 971 might include a complementary metal-oxide-semiconductor (CMOS) image sensor, a charge-coupled device (CCD) image sensor or other image detector array like any of those used in digital cameras. Each actual detector at a pixel of the image sensor array could be coupled to one or more of the cells 900 of the array 909.

In an apparatus 970, with an optical/electrical transducer 971, the electrowetting cell array 909 may have one or more lenses on one side or the other side or have lenses on both sides, of the electrowetting cell array 909, along the axis of the optical path through the cell array 909 and to or from the transducer 971. Although there may be more or fewer lenses than there are cells 900 in the array 909, we will consider lens array arrangements, e.g. in which a lens array 953*a* or 955*a* has a lens 953 or 955 coupled to each cell 900 of the array 909. Hence, FIG. 9 shows a dotted line (optional) example of a lens array 953*a* between the transducer 971 and the electrowetting cell array 909. Similarly, FIG. 9 shows a dotted line (optional) example of a lens array 955*a* on the side of the electrowetting cell array 909 opposite the transducer 971. In the example, the lenses 951 or 953 would be fixed lenses.

Although the array structure(s) are different, various examples of arrangements of a controllable electrowetting array with one or more cascaded lenses are disclosed in U.S. patent application Ser. No. 15/389,829, filed Dec. 23, 2016, entitled "Electrowetting Cellular Array And Luminaire Incorporating The Array," the disclosure of which is entirely incorporated by reference.

Although not shown, additional optical processing elements may be provided in the apparatus 970. In a luminaire for general illumination or in another type of light emission device (e.g. a flash), each emitter type transducer in an array implementation of the transducer 971 may be coupled to one or more of the electrowetting lenses 900 of array 909 via a collimating optic, such as a total internal reflection (TIR) lens.

A transducer 971, such as a light emitter or a light detector, often connects to corresponding electrical circuitry to operate the particular type of transducer, e.g. a driver circuit array to supply power to each emitter of an emitter array or sense circuitry to process output signals from the detectors (and provide power to the detectors if/when necessary). Hence, to operate the transducer 971, the controller 980 includes corresponding an array driver or sense circuit 981. The type of circuitry 981 would depend on the type of transducer 971, e.g. the particular array of emitters of a display or multi-pixel luminaire type source or the particular type of image sensor array.

The controller 980 includes an electrowetting (EW) driver 983 to selectively provide signals to the electrodes (e.g. voltages between respective control channel electrodes and the common electrode) to control the fluid state of each electrowetting cell 900 of the array 909. As outlined earlier, the driver 983 may be connected to control all of the cells 900 as a single group, as some number of sub-groups (e.g. lines or sub-matrices), or as individual controllable optics.

The driver 983, for example, may include circuitry constructed/configured to apply direct current (DC) voltages or alternating current (AC) voltages or AC with a DC offset to electrodes of each cell or in common to the electrodes of some number of the cells of the array 909. If all cells are controlled in common, the circuitry of the driver 983 may be similar to that of the driver 963 discussed above, although driver 983 may have a higher power capacity to drive more cells in common. If cells are controlled individually, the driver 983 may include circuitry of a driver similar to that of the driver 963 discussed above, for each cell 900 of the array 909 or multiplexing circuitry to supply drive signals to the various cells from one or a small number of individual drivers (e.g. on a sequential basis). In a system implementation where sets of one or more lines or sub-matrix groups of cells are controlled in common, the driver 983 may include circuitry of a driver similar to that of the driver 963 discussed above, for each group of cells 900 of the array 909 that are to be commonly controlled. The separate drivers in this later implementation, however, would allow independent control of the different groups of cells within the array 909. Multiplexing may also be used to independently drive the various groups of cells 900.

The controller 980 also includes a processor, which in this example, is implemented by a microprocessor 986. The microprocessor 986 is programmed to implement control and other processing functions of a central processing unit (CPU) of the controller 980. The microprocessor 986, for example, may be based on any known or available microprocessor architecture, such as a Reduced Instruction Set Computing (RISC) using ARM architecture, as commonly used today in mobile devices and other portable electronic devices. Of course, other microprocessor circuitry may be used to form the CPU of the controller 980. Although the illustrated example includes only one microprocessor 986, for convenience, a controller 980 may use a multi-processor architecture.

The controller 980 also includes one or more digital storage media, represented by the memory 987, for storage of data and programming. The storage media represented by the memory 987 may include volatile and/or non-volatile semiconductor memory, any suitable type of magnetic or optical storage media, etc. The microprocessor 986 implements the control logic for the controller 980 and thus of the system 975, based on executable instructions of the programming, which in the example is stored in the memory 987. The executable instructions may be firmware or software instructions, to configure the microprocessor 986 to perform electrowetting control operations, lighting control operations or light detection operations, etc. Based on execution of the program instructions, the microprocessor 986, for example, implements the logic for control of operations of the transducer 971 and the cellular electrowetting array 909, in the associated optical/electrical apparatus 970. Although shown as controlling only one such apparatus 970, the microprocessor 986 and thus the controller 980 may control a number of such apparatuses 970.

Although shown in simplified block form, the architecture of controller 980 may be similar to that of any of a variety of types of types of other smart electronic devices, such as an architecture for a personal computer or an architecture for a mobile terminal device.

The processor 866 of the MCU 865 (FIG. 8) and the microprocessor 986 (FIG. 9) are examples of processors that may be used to control an electrowetting cell or array of such cell and control or respond to outputs of any associated optical/electrical transducer(s). As used herein, a processor is a hardware circuit having elements structured and arranged to perform one or more processing functions, typically various data processing functions. Although discrete logic components could be used, the examples utilize components forming a programmable central processing unit (CPU). A processor for example includes or is part of one or more integrated circuit (IC) chips incorporating the electronic elements to perform the functions of the CPU.

The processor 866 or the microprocessor 986 executes programming or instructions to configure the system 845 or 975 to perform various operations. For example, such operations may include various general operations (e.g., a clock function, recording and logging operational status and/or failure information) as well as various system-specific operations (e.g. controlling beam steering and beam shaping of input or output light, operation of the transducer(s) and the like) of an optical/electrical apparatus 860 or 980 incorporating one or more of the electrowetting cells and associated transducer(s). Although a processor may be configured by use of hardwired logic, typical processors in lighting devices are general processing circuits configured by execution of programming, e.g. instructions and any associated setting data from the memories shown or from other included storage media and/or received from remote storage media.

As outlined above, a class of applications of the cell 900 with suitable light source type transducers provide configurable luminaires. The term "luminaire," as used herein, is intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a luminaire may provide light for use by automated equipment, such as sensors/monitors, robots, etc. that may occupy or observe the illuminated space, instead of or in addition to light provided for an organism. However, it is also possible that one or more luminaires in or on a particular premises have other lighting purposes, such as signage for an entrance or to indicate an exit. In most examples, the luminaire(s) illuminate a space or area of a premises to a level useful for a human in or passing through the space, e.g. general illumination of a room or corridor in a building or of an outdoor space such as a street, sidewalk, parking lot or performance venue. The actual source of illumination light in or supplying the light for a luminaire may be any type of artificial light emitting device, several examples of which are included in the discussions below. Other large format lighting applications for the electrowetting cell constructs include vehicle lighting or the like.

Terms such as "artificial lighting," as used herein, are intended to encompass essentially any type of lighting that a device produces light by processing of electrical power to generate the light. An artificial lighting device, for example, may take the form of a lamp, light fixture, or other luminaire that incorporates a light source, where the light source by itself contains no intelligence or communication capability, such as one or more LEDs or the like, or a lamp (e.g. "regular light bulbs") of any suitable type. The illumination light output of an artificial illumination type luminaire, for example, may have an intensity and/or other characteristic(s) that satisfy an industry acceptable performance standard for a general lighting application.

Artificial light output from a luminaire may carry information, such as a code (e.g. to identify the luminaire or its location) or downstream transmission of communication signaling and/or user data. The light based data transmission may involve modulation or otherwise adjusting parameters (e.g. intensity, color characteristic or optical spatial distribution) of the illumination light output from the device.

Another class of applications for the electrowetting cell relate to sensing applications. A sensing application typically combines a detector type transducer with one or more electrowetting. The detector, for example, may be a single light responsive component, a combination of several light responsive components detecting the same or different light characteristics, or a pixel array of light detectors (e.g. for image sensing). Although some photovoltaic devices may output power in response to optical energy, sensors typically involve some processing circuitry to operate the particular type of detector.

Displays and a variety of other applications of the electrowetting cell also are within the scope of the disclosure above.

In the examples of shown FIGS. 1-5, both first and second plates and the associated end walls where light enters or exits can be transparent. As a result, the electrowetting cell allows passage of light through the fluids within the cell, for example along and about the optical axis A-A. Light passing through such a cell may be refracted as a result of passage through the fluids in an amount dependent on the shape of the meniscus between the fluids, which is electrically controllable and refractive index difference between the fluids. Passage and such refraction of light through the cell may apply to light entering the cell in either direction, e.g. through either of the first and second plates and associated end walls. In such a cell, refracted light similarly may emerge from the cell in either direction, e.g. through either of the first and second plates and associated end walls.

Hence, the examples shown and described above relate to a light transmissive electrowetting cell, that is to say a cell that acts as a lens and/or prism and is relatively transparent with respect to light that passes entirely through the optically active area of the cell. Teachings herein may also relate to reflective electrowetting cells. For a reflective cell, a reflector could either be at one end of the well (distal end or the first plate covering the opening of the well) or at the meniscus forming the interface of the two fluids. Alternatively, one of the fluids could be reflective, in which case that fluid itself could be used as reflector without adding any extra reflector.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electrowetting cell comprising:
   a non-transparent substrate that includes a well filled with at least one fluid and an external contact surface that is outside of the electrowetting cell, the substrate being formed of ceramic or fiberglass mesh infused with resin and extending laterally around the well to enclose sides of the well;
   a control channel electrode connection pad on the external contact surface;
   a common electrode connection pad on the external contact surface;
   a first plate coupled to the substrate to seal a top of the well and residing in an optical active area through which light is transmitted or reflected;
   a second plate coupled to the substrate to seal a bottom of the well and residing in the optical active area, wherein at least one of the first plate and the second plate is transparent;
   a control channel electrode on the substrate configured to control a shape of the at least one fluid via an electric field;
   a common electrode;
   a control channel electrode interconnect connected to the control channel electrode and the control channel electrode connection pad; and
   a common electrode interconnect connected to the common electrode and the common electrode connection pad.

2. The electrowetting cell of claim 1, wherein:
   the control channel electrode interconnect includes at least one control channel electrode via formed in the substrate that extends between the control channel electrode and the control channel electrode connection pad to provide electrical connectivity between the control channel electrode and the control channel electrode connection pad.

3. The electrowetting cell of claim 2, wherein the at least one control channel electrode via is a through hole via.

4. The electrowetting cell of claim 3, wherein the through hole via is formed perpendicular to the substrate.

5. The electrowetting cell of claim 2, wherein:
the control channel electrode interconnect further includes an internal conductive trace; and
at least one control channel electrode via is a blind via that intersects the internal conductive trace.

6. The electrowetting cell of claim 5, wherein the internal conductive trace is a planar electrode formed parallel to the substrate and the via is formed perpendicular to the substrate.

7. The electrowetting cell of claim 1, wherein the control channel electrode interconnect is a conductive layer deposited on a second surface of the substrate that leads to the control channel electrode connection pad on the external contact surface to provide electrical connectivity between the control channel electrode and the control channel electrode connection pad.

8. The electrowetting cell of claim 1, further comprising:
a circuit board coupled to the external contact surface and having circuit connections in electrical contact with the control channel electrode connection pad and the common electrode connection pad to supply a drive voltage to the control channel electrode.

9. The electrowetting cell of claim 1, wherein:
the common electrode interconnect includes at least one common electrode via formed in the substrate that extends between the common electrode and the common electrode connection pad to provide electrical connectivity between the common electrode and the common electrode connection pad.

10. The electrowetting cell of claim 1, wherein:
the substrate comprises layers; and
at least part of the interconnects is formed as a conductor between two of the layers.

11. The electrowetting cell of claim 1, wherein the well is filled with two immiscible fluids, the cell further comprising:
a plurality of control channel electrodes, wherein two sets of control channel electrodes are at different heights on walls of the well.

12. An apparatus comprising the electrowetting cell of claim 11 and an optical/electrical transducer optically coupled to the electrowetting cell to send or receive light through the two immiscible fluids in the well.

13. A system comprising the apparatus of claim 12 and a processor coupled to the electrowetting cell and the optical/electrical transducer.

14. An electrowetting cell optic comprising:
a non-transparent substrate that includes a well filled two fluids and an external contact surface outside the well and around at least a portion of one end of the well, the substrate being formed of ceramic or fiberglass mesh infused with resin and extending laterally around the well to enclose sides of the well;
a plurality of control channel electrode connection pads on the external contact surface;
a common electrode connection pad on the external contact surface;
a first plate coupled to the substrate to seal a top of the well and form a first transparent window at one axial end of the well, the first plate residing in an optical active area through which light is transmitted or reflected;
a second plate coupled to the substrate to seal a bottom of the well and form a second transparent cover window at an opposite axial end of the well, the second plate residing in the optical active area;
a plurality of control channel electrodes to control shape of a meniscus formed between the two fluids via separately controllable electric fields, each of the control channel electrodes being mounted to the substrate on a wall of the well;
a common electrode located on the substrate to contact a conductive one of the fluids;
a respective control channel electrode interconnect connected to each respective control channel electrode and a respective control channel electrode connection pad; and
a common electrode interconnect connected to the common electrode and the common electrode connection pad.

15. The electrowetting cell optic of claim 14, wherein:
at least one respective control channel electrode interconnect includes at least one control channel electrode via formed in the substrate that extends between one of the control channel electrodes and one of the control channel electrode connection pads.

16. The electrowetting cell optic of claim 14, wherein:
at least one respective control channel electrode interconnect is a conductive layer deposited on a second surface of the substrate that leads to one of the respective control channel electrode connection pads on the external contact surface to provide electrical connectivity between one of the respective control channel electrodes and the one respective control channel electrode connection pads.

17. The electrowetting cell optic of claim 14, wherein:
the common electrode interconnect includes at least one common electrode via formed in the substrate that extends between the common electrode connection pad and the common electrode.

18. A luminaire comprising:
a light source to emit artificial lighting for general illumination of a space of a premises to a level useful for a human in or passing through the space;
an electrowetting cell to modulate a light distribution output form the light source, the electrowetting cell including:
a non-transparent substrate that includes a well filled two fluids and an external contact surface outside the well and around at least a portion of one end of the well, the substrate being formed of ceramic or fiberglass mesh infused with resin and extending laterally around the well to enclose sides of the well;
a plurality of control channel electrode connection pads on the external contact surface;
a common electrode connection pad on the external contact surface;
a first plate coupled to the substrate to seal a top of the well and form a first transparent window at one axial end of the well, the first plate residing in an optical active area through which light is transmitted or reflected;
a second plate coupled to the substrate to seal a bottom of the well and form a second transparent cover window at an opposite axial end of the well, the second plate residing in the optical active area;
a plurality of control channel electrodes to control shape of a meniscus formed between the two fluids via separately controllable electric fields, each of the control channel electrodes being mounted to the substrate on a wall of the well;

a common electrode located on the substrate to contact a conductive one of the fluids;
a respective control channel electrode interconnect connected to each respective control channel electrode and a respective control channel electrode connection pad; and
a common electrode interconnect connected to the common electrode and the common electrode connection pad.

* * * * *